(12) United States Patent
Avedissian

(10) Patent No.: US 10,796,093 B2
(45) Date of Patent: Oct. 6, 2020

(54) AUTOMATIC GENERATION OF STATEMENT-RESPONSE SETS FROM CONVERSATIONAL TEXT USING NATURAL LANGUAGE PROCESSING

(71) Applicant: Elastic Minds, LLC, Encino, CA (US)

(72) Inventor: Narbeh Avedissian, Studio City, CA (US)

(73) Assignee: Elastic Minds, LLC, Encino, CA (US)

(*) Notice: Subject to any disclaimer, the term of this patent is extended or adjusted under 35 U.S.C. 154(b) by 0 days.

(21) Appl. No.: 16/796,833

(22) Filed: Feb. 20, 2020

(65) Prior Publication Data

US 2020/0279075 A1 Sep. 3, 2020

Related U.S. Application Data

(63) Continuation-in-part of application No. 16/504,883, filed on Jul. 8, 2019, which is a continuation of
(Continued)

(51) Int. Cl.
*G06N 3/04* (2006.01)
*G06N 20/00* (2019.01)
(Continued)

(52) U.S. Cl.
CPC .......... *G06F 40/284* (2020.01); *G06F 40/211* (2020.01); *G06F 40/30* (2020.01);
(Continued)

(58) Field of Classification Search
CPC .... G06F 40/284; G06F 40/2211; G06F 40/30; G06N 20/00; G06N 3/04; G06K 9/6267
See application file for complete search history.

(56) References Cited

U.S. PATENT DOCUMENTS 5,774,869 A 6/1998 Toader
5,911,131 A 6/1999 Vig
(Continued)

OTHER PUBLICATIONS

Brownlee, How to Develop a Deep Convolutional Neural Network for Sentiment Analysis (Text Classification), 2017, Internet (Year: 2017).*

(Continued)

*Primary Examiner* — Sonia L Gay
(74) *Attorney, Agent, or Firm* — Knobbe, Martens, Olson & Bear LLP

(57) ABSTRACT

Systems and methods that access an online networked resource using a locator are disclosed. A first item of content on the networked resource is identified. A trigger rule comprising keywords and a sentiment classifier is accessed. A neural network, including input, hidden, and output layers, is used to assign a sentiment classification to the first item of content. The trigger rule, the sentiment classification, and identified keywords, are used to determine whether response content is to be posted to the online networked resource. In response to determining, using the trigger rule, the assigned sentiment classification, and keywords identified in the first item of content, that response content is to be posted to the online networked resource, the sentiment classification and identified keywords are used to select and/or generate a second item of content, and the second item of content is enabled to be posted to the online networked resource.

24 Claims, 14 Drawing Sheets

Related U.S. Application Data application No. 14/045,235, filed on Oct. 3, 2013, now Pat. No. 10,354,288, which is a continuation of application No. 11/687,658, filed on Mar. 18, 2007, now Pat. No. 8,595,057, which is a continuation-in-part of application No. 11/549,027, filed on Oct. 12, 2006, now abandoned.

(60) Provisional application No. 60/836,465, filed on Aug. 8, 2006.

(51) Int. Cl.
| G06K 9/62 | (2006.01) |
| G06F 40/284 | (2020.01) |
| G06F 40/30 | (2020.01) |
| G06F 40/211 | (2020.01) |

(52) U.S. Cl.
CPC ............ *G06K 9/6267* (2013.01); *G06N 3/04* (2013.01); *G06N 20/00* (2019.01)

(56) References Cited

U.S. PATENT DOCUMENTS

| 5,913,204 | A | 6/1999 | Kelly |
| 6,029,141 | A | 2/2000 | Bezos et al. |
| 6,073,127 | A | 6/2000 | Lannert et al. |
| 6,216,112 | B1 | 4/2001 | Fuller et al. |
| 6,248,946 | B1 | 6/2001 | Dwek |
| 6,317,881 | B1 | 11/2001 | Shah-Nazaroff et al. |
| 6,343,313 | B1 | 1/2002 | Salesky et al. |
| 6,363,356 | B1 | 3/2002 | Horstmann |
| 6,466,213 | B2 | 10/2002 | Bickmore et al. |
| 6,530,082 | B1 | 3/2003 | Del Sesto et al. |
| 6,578,008 | B1 | 6/2003 | Chacker |
| 6,691,158 | B1 | 2/2004 | Douvikas |
| 6,968,243 | B1 | 11/2005 | Oh |
| 7,069,310 | B1 | 6/2006 | Bartholomew |
| 7,076,434 | B1 | 7/2006 | Newman et al. |
| 7,080,139 | B1 | 7/2006 | Briggs et al. |
| 7,087,829 | B2 | 8/2006 | Hasegawa |
| 7,096,080 | B2 | 8/2006 | Asada |
| 7,162,433 | B1 | 1/2007 | Foroutan |
| 7,191,023 | B2 | 3/2007 | Williams |
| 7,539,742 | B2 | 5/2009 | Spector |
| 7,603,626 | B2 | 10/2009 | Williams |
| 7,657,425 | B2 | 2/2010 | Ejerhed et al. |
| 7,720,707 | B1 | 5/2010 | Mowry |
| 7,865,394 | B1 | 1/2011 | Calloway et al. |
| 7,904,399 | B2 | 3/2011 | Subramaniam et al. |
| 8,078,698 | B2 | 12/2011 | Moore |
| 8,103,545 | B2 | 1/2012 | Ramer et al. |
| 8,290,824 | B1 | 10/2012 | Mesaros |
| 8,442,940 | B1 | 5/2013 | Faletti et al. |
| 8,595,057 | B2 | 11/2013 | Avedissian |
| 8,990,678 | B2 | 3/2015 | Bedingfield |
| 9,104,669 | B1 | 8/2015 | Des Jardins |
| 9,348,817 | B2 | 5/2016 | Bohra et al. |
| 10,521,463 | B2 | 12/2019 | Byron et al. |
| 2002/0038221 | A1 | 3/2002 | Tiwary et al. |
| 2002/0065826 | A1 | 5/2002 | Bell et al. |
| 2002/0087403 | A1 | 7/2002 | Meyers et al. |
| 2002/0103695 | A1 | 8/2002 | Urken et al. |
| 2002/0112005 | A1 | 8/2002 | Namlas |
| 2002/0143607 | A1 | 10/2002 | Connelly |
| 2002/0152215 | A1 | 10/2002 | Clark et al. |
| 2002/0198723 | A1 | 12/2002 | Mowry |
| 2003/0014310 | A1 | 1/2003 | Jung et al. |
| 2003/0036944 | A1 | 2/2003 | Lesandrini et al. |
| 2003/0130894 | A1 | 7/2003 | Huettner et al. |
| 2003/0079015 | A1 | 8/2003 | Fein et al. |
| 2003/0149574 | A1 | 8/2003 | Rudman |
| 2003/0171982 | A1 | 9/2003 | Paul |
| 2003/0187802 | A1 | 10/2003 | Booth |
| 2004/0003097 | A1 | 1/2004 | Willis et al. |
| 2004/0015427 | A1 | 1/2004 | Camelio |
| 2004/0030741 | A1 | 2/2004 | Wolton et al. |
| 2004/0093236 | A1 | 5/2004 | Chacker |
| 2004/0093249 | A1 | 5/2004 | Checker |
| 2004/0103024 | A1 | 5/2004 | Patel et al. |
| 2005/0071865 | A1 | 3/2005 | Martins |
| 2005/0081163 | A1 | 4/2005 | McLenna et al. |
| 2005/0120389 | A1 | 6/2005 | Boss et al. |
| 2005/0246377 | A1 | 11/2005 | Faso |
| 2005/0273489 | A1 | 12/2005 | Pecht |
| 2005/0276246 | A1 | 12/2005 | Walker et al. |
| 2005/0283753 | A1 | 12/2005 | Ho |
| 2006/0026593 | A1 | 2/2006 | Canning et al. |
| 2006/0074753 | A1 | 4/2006 | Schuh et al. |
| 2006/0106675 | A1 | 5/2006 | Cohen et al. |
| 2006/0143068 | A1 | 6/2006 | Calabria |
| 2006/0149681 | A1 | 7/2006 | Meisner |
| 2006/0155575 | A1 | 7/2006 | Gross |
| 2006/0212350 | A1 | 9/2006 | Ellis et al. |
| 2006/0212367 | A1 | 9/2006 | Gross |
| 2006/0229993 | A1 | 10/2006 | Cole |
| 2006/0242139 | A1 | 10/2006 | Butterfield et al. |
| 2006/0242269 | A1 | 10/2006 | Gross |
| 2006/0242554 | A1 | 10/2006 | Gerace et al. |
| 2006/0218153 | A1 | 11/2006 | Voon et al. |
| 2006/0251399 | A1 | 11/2006 | Ando et al. |
| 2006/0253599 | A1 | 11/2006 | Monteiro et al. |
| 2006/0287916 | A1 | 12/2006 | Starr et al. |
| 2006/0292541 | A1 | 12/2006 | Ehmann |
| 2007/0044639 | A1 | 3/2007 | Farbood et al. |
| 2007/0073625 | A1 | 3/2007 | Shelton |
| 2007/0112762 | A1 | 5/2007 | Brubaker |
| 2007/0156507 | A1 | 7/2007 | Connelly et al. |
| 2007/0233564 | A1 | 10/2007 | Arnold |
| 2007/0243509 | A1 | 10/2007 | Stiebel |
| 2007/0282813 | A1 | 12/2007 | Cao et al. |
| 2007/0294177 | A1 | 12/2007 | Volk et al. |
| 2008/0034066 | A1 | 2/2008 | Shamus et al. |
| 2008/0050713 | A1 | 2/2008 | Avedissian |
| 2008/0050714 | A1 | 2/2008 | Avedissian |
| 2008/0082417 | A1 | 4/2008 | Publicover |
| 2008/0104626 | A1 | 5/2008 | Avedissian |
| 2008/0104627 | A1 | 5/2008 | Avedissian |
| 2008/0262931 | A1 | 10/2008 | Chan et al. |
| 2009/0116668 | A1 | 5/2009 | Davidson |
| 2009/0192972 | A1 | 7/2009 | Spivack et al. |
| 2009/0216772 | A1 | 8/2009 | Goldfarb |
| 2009/0228347 | A1 | 9/2009 | Spector |
| 2009/0287532 | A1 | 11/2009 | Cohen et al. |
| 2009/0287678 | A1 | 11/2009 | Brown et al. |
| 2009/0292680 | A1 | 11/2009 | Sabani |
| 2009/0299932 | A1 | 12/2009 | Hodge et al. |
| 2010/0151889 | A1 | 6/2010 | Chen et al. |
| 2011/0066587 | A1 | 3/2011 | Ferrucci et al. |
| 2011/0125734 | A1 | 5/2011 | Duboue et al. |
| 2011/0151852 | A1 | 6/2011 | Olincy et al. |
| 2012/0041937 | A1 | 2/2012 | Dhillon et al. |
| 2012/0330882 | A1 | 12/2012 | Ferrucci et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0177893 | A1 | 7/2013 | Feng et al. |
| 2013/0226559 | A1 | 8/2013 | Lim et al. |
| 2015/0006143 | A1 | 1/2015 | Skiba |
| 2016/0132590 | A1 | 5/2016 | Byron et al. |
| 2016/0171094 | A1 | 6/2016 | Byron et al. |
| 2017/0169339 | A1* | 6/2017 | Dalmia .................. G06N 5/047 |
| 2017/0250931 | A1* | 8/2017 | Ioannou .................. H04L 67/18 |
| 2018/0359199 | A1* | 12/2018 | Nguyen ............... G06Q 10/107 |

OTHER PUBLICATIONS

Du et al., Sentiment Classification Via Recurrent Convolutional Neural Networks, 2017, 2nd International Conference on Computer Engineering, Information Science and Internet Technology (CII 2017) (Year: 2017).*

DialogSrch11Jul2013/ Examiner Dialog search conducted Jul. 11, 2013.

(56) References Cited

OTHER PUBLICATIONS

Havighurst, Craig, "Webcasters say proposed royalty rate will put them out of business," BYLINE (BUSINESS; p. 1E); Jul. 1, 2002.
Merriam-Webster's Collegiate Dictionary, Tenth Edition (Merriam-Webster, Incorporated 1998) at p. 380.
Merriam-Webster's Collegiate Dictionary, Tenth Edition (Merriam-Webster, Incorporated 1998) at p. 1196.
Mowatt, Raoul V., in "Web radio royalty rate Postponed" (METRO; zone: n; p. 2), May 22, 2002.
Webpage from www.MySpace.com, Selecting MySpace Music; captured Aug. 9, 2007, original publication date Unknown.
Webpage from www.MySpace.com, Selecting MySpace Ringtones; captured Aug. 9, 2007, original publication date Unknown.
Webpage from www.YouTube.com, Selecting YouTube Community, captured Aug. 9, 2007, original publication date Unknown.
Webpage from www.YouTube.com, Selecting YouTube Contests, captured Aug. 9, 2007, original publication date Unknown.
Webpage from www.IdolUnderground.com, Selecting homepage, captured Aug. 9, 2007, original publication date Unknown.
Webpage from www.IdolUnderground.com, Selecting Idol Underground Competitions, captured Aug. 9, 2007, original publication date Unknown.
Webpage from www.MusicNation.com, Selecting homepage, captured Aug. 9, 2007, original publication date Unknown.
"What is Tonos?", pp. 1-3, http://www.tonos.com/app2/tonos/jsp/what_is_tonos.jsp, 2001-2002.
www.talentnetworks.com, 53 pages, Jun. 12, 2003.

* cited by examiner

| SENTIMENT LABEL | KEYWORD PHRASE #1 | KEYWORD PHRASE #2 | KEYWORD PHRASE #3 | KEYWORD PHRASE #4 | ...... | KEYWORD PHRASE #N |
|---|---|---|---|---|---|---|
| 1 | RESPONSE$_{11}$ | RESPONSE$_{21}$ | RESPONSE$_{31}$ | RESPONSE$_{41}$ | | RESPONSE$_{N1}$ |
| 2 | RESPONSE$_{12}$ | RESPONSE$_{22}$ | RESPONSE$_{32}$ | RESPONSE$_{42}$ | | RESPONSE$_{N2}$ |
| 4 | RESPONSE$_{13}$ | RESPONSE$_{23}$ | RESPONSE$_{33}$ | RESPONSE$_{43}$ | | RESPONSE$_{N3}$ |
| 5 | RESPONSE$_{14}$ | RESPONSE$_{24}$ | RESPONSE$_{34}$ | RESPONSE$_{44}$ | | RESPONSE$_{N4}$ |

FIG.5

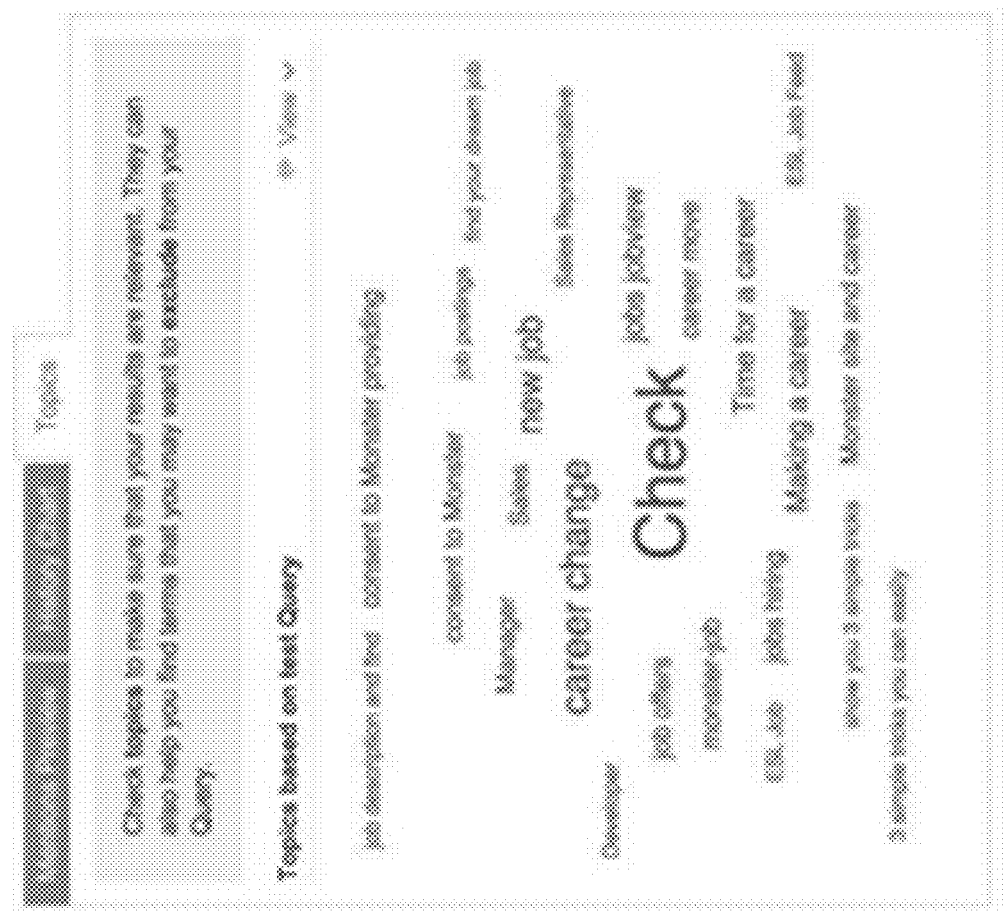
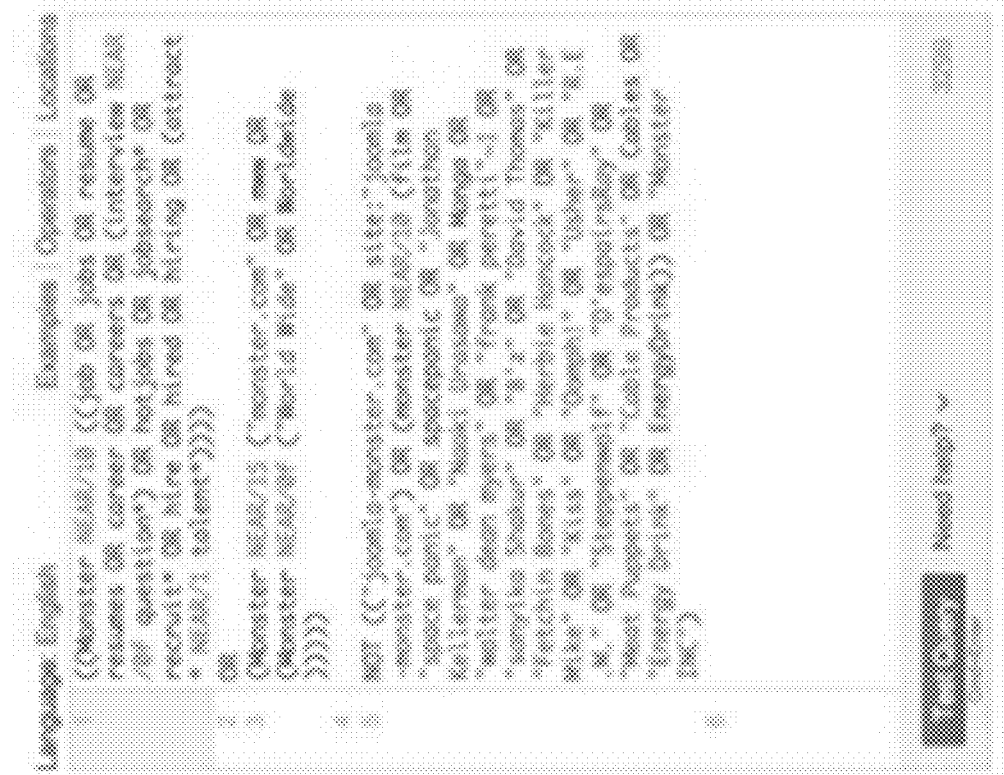
FIG. 8D

AUTOMATIC GENERATION OF STATEMENT-RESPONSE SETS FROM CONVERSATIONAL TEXT USING NATURAL LANGUAGE PROCESSING

BACKGROUND OF THE INVENTION

Incorporation by Reference to any Priority Applications

Any and all applications for which a foreign or domestic priority claim is identified in the Application Data Sheet as filed with the present application are hereby incorporated by reference under 1 CFR 1.57.

FIELD OF THE INVENTION

The invention relates to natural language processing, and in particular, to utilizing natural language processing in generating response statements.

DESCRIPTION OF THE RELATED ART

Networked information sharing systems are becoming increasingly essential for the aggregation and dissemination of information. However, conventional information sharing systems often aggregate and disseminate low quality information and fail to provide an adequate mechanism for identifying and correcting such low quality information. Thus, such low quality information becomes further distributed over networked resources, disadvantageously utilizing ever more memory and processing resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a non-transitory computer-readable medium comprising computer-readable instructions which when executed by one or more processors cause said one or more processors to perform a process comprising: access a locator of an online networked resource; access the online networked resource using the locator; identify a first item of content of a first type on the accessed online networked resource; access a trigger rule, the trigger rule comprising one or more keywords and a sentiment classifier; use a neural network comprising: an input layer, one or more hidden layers, and an output layer, to assign a sentiment classification to the first item of content; identify whether the first item of content includes one or more of the keywords; determine, using the trigger rule, the assigned sentiment classification generated using the neural network and keywords identified in the first item of content, whether response content is to be posted to the online networked resource; at least partly in response to determining, using the trigger rule, the assigned sentiment classification generated using the neural network and keywords identified in the first item of content, that response content is to be posted to the online networked resource, use a response matrix, the assigned sentiment classification generated using the neural network and keywords identified in the first item of content to select a second item of content; enable the selected second item of content to be posted to the online networked resource.

An aspect of the present disclosure relates to a computer-implemented method, the method comprising: accessing, using a computer system including one or more computing devices, a locator of an online networked resource; accessing, using the computer system, the online networked resource using the locator; identifying, using the computer system, a first item of content on the accessed online networked resource; accessing, using the computer system, a trigger rule, the trigger rule comprising one or more keywords and a sentiment classifier; using a learning engine to assign a sentiment classification to the first item of content; identifying whether the first item of content includes one or more of the keywords; determine, using the trigger rule, the assigned sentiment classification generated using the learning engine and keywords identified in the first item of content, whether response content is to be posted to the online networked resource; at least partly in response to determining, using the trigger rule, the assigned sentiment classification generated using the learning engine and keywords identified in the first item of content, that response content is to be posted to the online networked resource, using the assigned sentiment classification generated using the neural network and keywords identified in the first item of content to select and/or generate a second item of content; and enabling the second item of content to be posted to the online networked resource.

An aspect of the present disclosure relates to a computer system comprising: a computing device; a network interface; a non-transitory data media configured to store instructions that when executed by the computing device, cause the computing device to perform operations comprising: access a locator of an online networked resource; access the online networked resource using the locator; identify a first item of content on the accessed online networked resource; access a trigger rule, the trigger rule comprising one or more keywords and a sentiment classifier; use a learning engine to assign a sentiment classification to the first item of content; identify whether the first item of content includes one or more of the keywords; determine, using the trigger rule, the assigned sentiment classification generated using the learning engine and keywords identified in the first item of content, whether response content is to be posted to the online networked resource; at least partly in response to determining, using the trigger rule, the assigned sentiment classification generated using the learning engine and keywords identified in the first item of content, that response content is to be posted to the online networked resource, use the assigned sentiment classification generated using the neural network and keywords identified in the first item of content to select and/or generate a second item of content; and enable the second item of content to be posted to the online networked resource.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIG. 5 illustrates an example response selection matrix.

FIGS. 8A-8E illustrate example user interfaces.

DETAILED DESCRIPTION

Figure 1A:
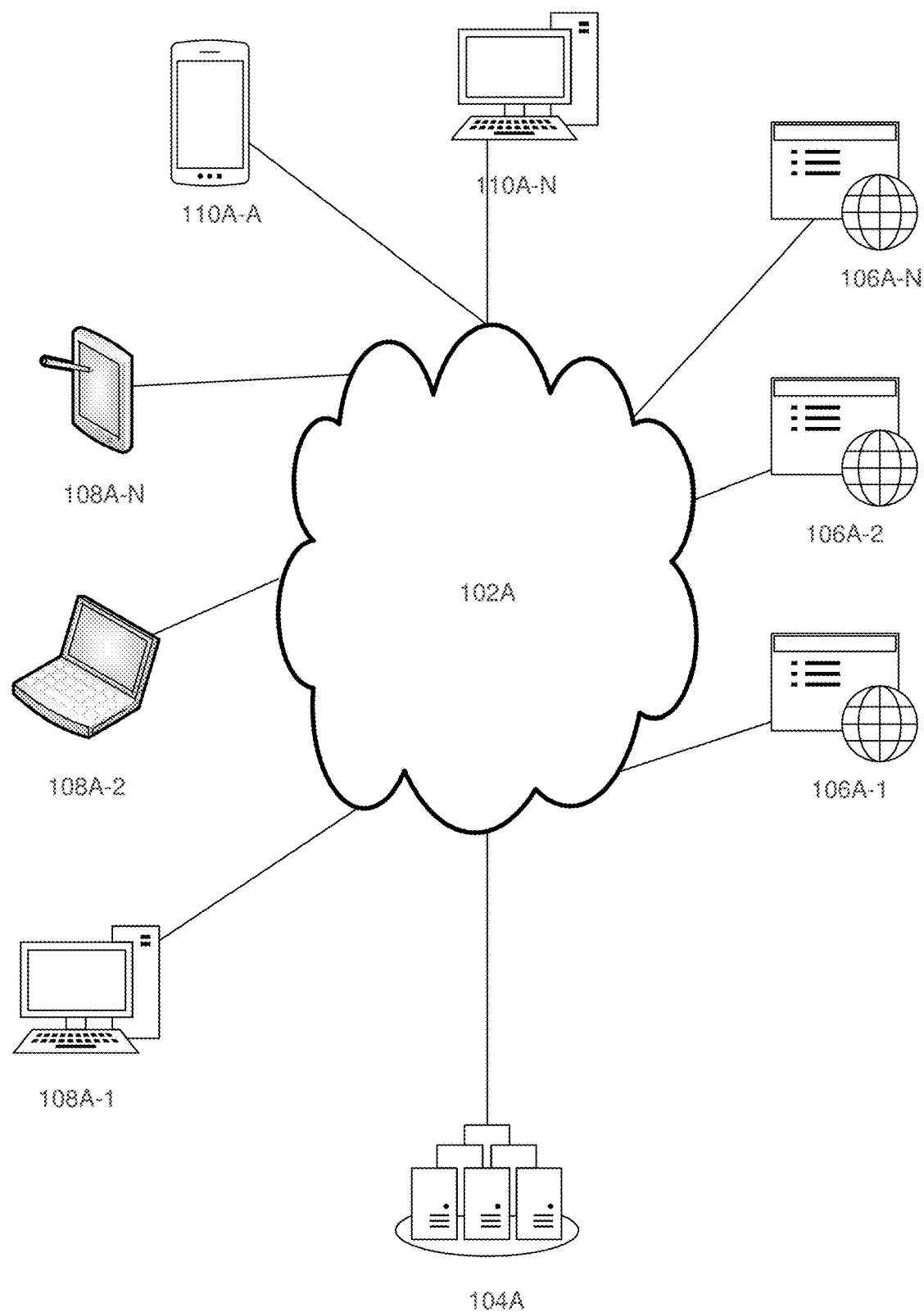
FIG. 1A is a block diagram illustrating an example embodiment of an operating environment.

With the increased usage of computing networks and communication platforms, there has been a resultant increase in statement and communication on disparate communication platforms, such as social networking platforms. However, many such statements may be inaccurate, offensive, or misleading. Conventional systems are unable to detect, identify, and respond to such statements. Thus, such low quality information becomes further distributed over networked resources, disadvantageously utilizing ever more memory and processing resources.

An aspect of the present disclosure relates to methods and systems that utilize natural language processing implemented using a natural language processing engine to monitor and respond to user comments with automated, optionally real-time responses using a commenting engine. Such responses may provide corrective information and may inhibit the further electronic distribution of low quality information, thereby reducing the computer, memory, and network resources that would otherwise be utilized in further distribution and maintenance of such low quality information.

For example, as will be described in greater detail, various online platforms and electronic documents (e.g., social networking platforms, microblog platforms, content sharing platforms, webpages, etc.) may be monitored for comments regarding a specified topic.

In response to determining that a comment has been made regarding the topic, a determination may be made as to the intent or sentiment of the topic (e.g., a negative comment, a positive comment, etc.). Based on the determined intent or sentiment of the comment, a determination may be made as to whether a responding comment should be made.

If a determination is made that a responding comment should be made, a determination may be made as to whether a standard, canned response should be used, or whether a response dynamically generated by a computer system based on the detected comment should be used, or whether the detected comment should be transmitted to a human agent to manually generated the response. The response may then be selected from a library of responses, generated by a response generation engine, or received from a human agent. The response may then be posted on the corresponding platform, optionally in-line with the original detected comment.

Natural language processing may be utilized to determine the sentiment or intent of a comment. Optionally, in order to reduce the utilization of computer resources (e.g., processor, memory, and/or network resources), natural language processing is not performed on a given user comment unless the user comment include a trigger phrase (including one or more words, which may include slang word) in a defined trigger dictionary. If the user comment does include a trigger word or phrase, then natural language processing may be used to further analyze the user comment to determine whether a response comment should be generated and if so, the content of the response comment.

For example, a trigger word may be a brand name of a product or service (e.g., a consumer product, a food product, a streaming service, an e-commerce service, a movie, a book, etc.), the name of a company or organization, the name of a person (e.g., a celebrity, athlete, politician), the name of political entity (e.g., city, state, or country), phrases typically associated with negative sentiment (e.g., junk, fake, greedy, total trash, hate it, etc.), phrases typically associated with negative sentiment (e.g., awesome, amazing, best, love, etc.), and/or the like.

Optionally, the identification of the platform on which the comment was posted may be utilized in determining the sentiment/intent of the comment. For example, on certain platforms a given obscenity may be meant as an insult, while on other platforms, the same obscenity may be interpreted as a compliment. In addition, the number of like and/or dislike indications regarding the comment provided by other users may be utilized in in determining the sentiment/intent of the comment.

Certain examples will now be described with respect to the figures.

Referring to FIG. 1A, an example architectural environment is illustrated. A content monitoring and response system 104A may be configured to monitor content posted on one more networked locations (e.g., platforms/documents 106A-1 . . . 106A-N) and may optionally be configured to selectively provide automatic generation of responses to content (e.g., responses to comments comprising textual statements, still or video images, graphic content, animated content, audio content, etc.). The analysis of comments may optionally be performed using natural language processing for text and audio comments, and image recognition for visual comments.

The content monitoring and response system 104A may comprise a hosted computing environment that includes a collection of physical computing resources that may be remotely accessible and may be rapidly provisioned as needed (sometimes referred to as a "cloud" computing environment), thereby providing higher system uptime and reliability and a more flexible and dynamic allocation of computer resources. The content monitoring and response system 104A may also include a data store described in greater detail herein. The data store is optionally a hosted storage environment that includes a collection of physical data storage devices that may be remotely accessible and may be rapidly provisioned as needed (sometimes referred to as "cloud" storage).

The content monitoring and response system 104A may be configured to enable certain authorized users (e.g., brand owners or someone acting on their behalf using systems 110A-1 . . . 110A-N) to specify platforms that are to be monitored for comments or other user content and may enables such authorized users to specify queries or triggers for user content. In addition, the content monitoring and response system 104A may execute certain processes described herein, or portions thereof. The content monitoring and response system 104A may provide authentication and encryption services to provide for secure communication and restricted access of data stores.

A plurality of disparate, distributed user systems 108A-1 . . . 108A-N may include standalone computers (e.g., desktop, laptop, tablet, smart phone, or other computer device), a centralized computer system, or a cloud computing system. The user systems 108A-1 . . . 108A-N may communicate with various platforms 106A-1 . . . 106A-N (e.g., social networking platforms, microblog platforms, video sharing platforms, product review sites, etc.). The platforms 106A-1 . . . 106A-N may be configured to receive user content, such as comments. A given platform 106A may comprise a dedicated server system or may be cloud based.

For example, a given user system 108A and a given entity system 110A may include some or all of the following: a display (e.g., a touch screen display), a microphone, a speaker, processing devices, memory, wireless network interfaces and/or wired network interfaces. The user systems 108A-1 . . . 108A-N and entity systems 110A-1 . . . 110A-N may be configured to receive and render certain user interfaces via a browser, dedicated platform application, or otherwise. For example, the entity systems 110A-1 . . . 110A-N may be configured to access and render user interfaces described herein. The user systems 108A-1 . . . 108A-N may be configured to transmit content (e.g., user comments) to be posted on one or more platforms. The entity systems 110A-1 . . . 110A-N may be configured to transmit content (e.g., promotional content, such as ads) to be posted on one or more platforms 106A-1 . . . 106A-N.

The communications between the entity systems 110A-1 . . . 110A-N and the content monitoring and response system 104A may be respectively encrypted and decrypted by the entity systems 110A-1 . . . 110A-N and the content monitoring and response system 104A.

The communications between the platforms 106A-1 . . . 106A-N and the content monitoring and response system 104A may be respectively encrypted and decrypted by the platforms 106A-1 . . . 106A-N and the content monitoring and response system 104A.

Figure 1B:
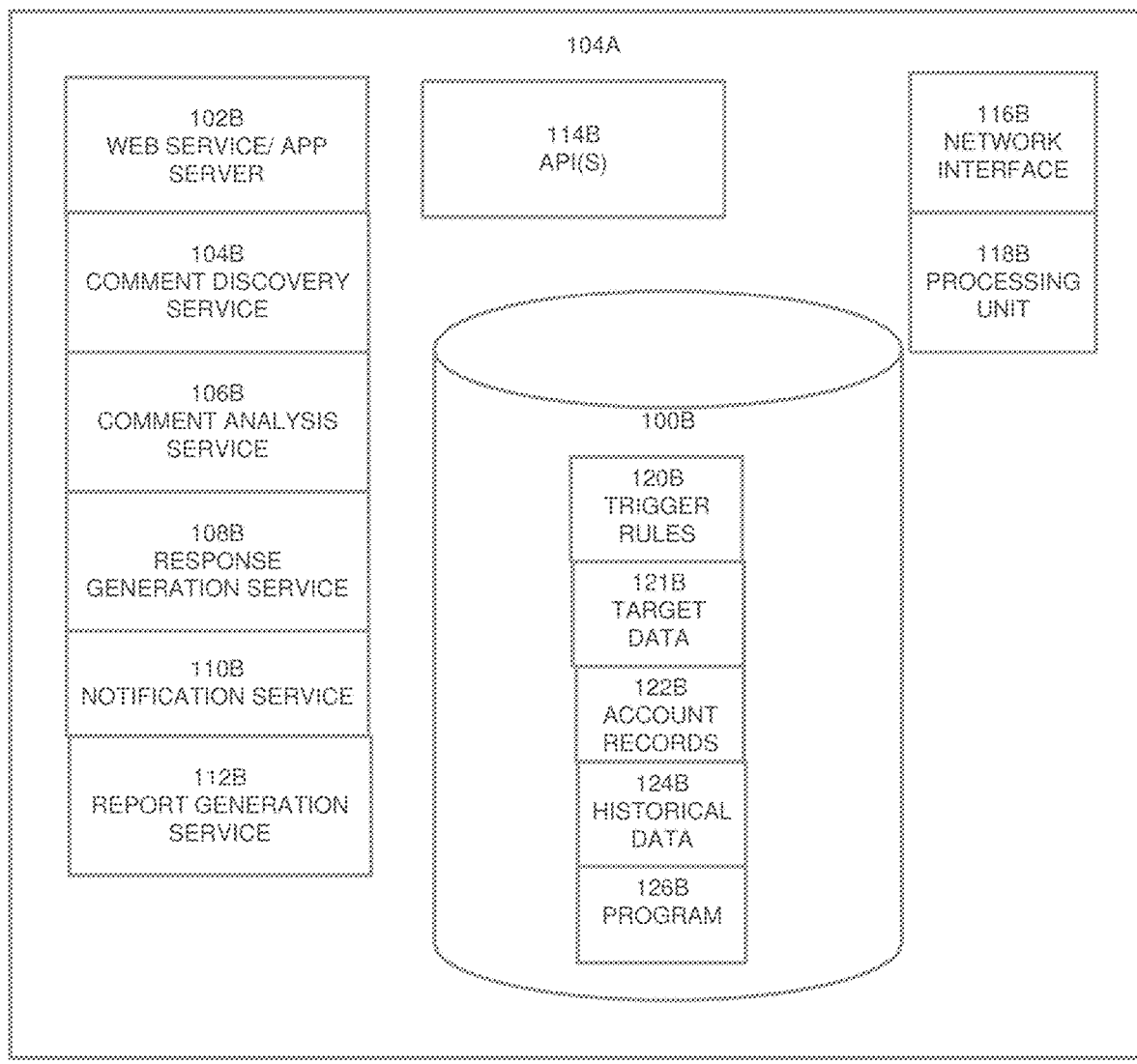
FIG. 1B is a block diagram illustrating an embodiment of example components of a content monitoring and response system.

With reference to FIG. 1B, an example content monitoring and response system 104A architecture is illustrated. A data store 100B is configured to store trigger/query definitions 120B (e.g., specified by a brand owner), optionally in association with an identifier as to the source of a given trigger/query definition (e.g., in the form of Boolean equations and/or sentiment classifications). The data store 100B may store target data 121B, such as social account locators (e.g., URLs), page titles and descriptions, email addresses, and/or other identifiers or information, that will be used to find content (e.g., user comments) to be examined using the trigger rules/queries.

The data store 100B may also store account records 122B of entities (e.g., brand owners) that may specify electronic and physical addresses (e.g., email address, messaging addresses, phone numbers, etc.), and instructions as to how often and on what platforms an analysis of user content is to be performed using corresponding trigger/query definitions.

The data store 100B may also store historical data 124B of the results of queries and/or analysis of user content on various platforms.

The data store 100B may also store program code 126B that when executed by a processing unit 118B (e.g., one or more microprocessor devices) may perform certain processes disclosed herein (including providing certain services disclosed herein).

One or more wired and/or wireless network interfaces 116B may be provided that enables the content monitoring and response system 104A to communicate with user devices, platform systems, and/or third party content detection and analysis systems.

A web service/app server 102B may provide webpages to devices (e.g., associated with entities such as brand owners or an entity working on behalf of a brand owner) that may include the example user interfaces described herein. In addition or instead, the web service/app server 102B may provide an application that may be downloaded to a system, where the application includes or provides access to user interfaces described herein.

A comment discovery service 104B may be utilized to search/scrape one or more destination platforms/documents for content that satisfies trigger rules/queries accessed from the data store 100B. For example, the comment discovery service 104B may access social account locators (e.g., URLs), page titles and descriptions, email addresses, and/or other identifiers or information from the data store 100B, and then perform a corresponding search for comments. By way of further example, the comment discovery service 104B may obtain an access token (e.g., from an API explorer) and unique identifiers associated with target pages to thereby access content associated with the target pages.

A comment analysis service 106B may be utilized to analyze content (e.g., user comments) to understand the content and/or the sentiment of the content identified using the comment discovery service 104B and to classify the content (e.g., hostile, sarcastic, threatening, complimentary, etc.).

For example, an artificial intelligence learning engine (such as a deep convolutional neural network or recursive convolutional network) may be utilized to analyze and classify content. A trigger rule may be used to determine if a response is to be provided based on the analysis. For example, a trigger rule may be in the form of a Boolean equations including key phrases and/or in the form of sentiment classifiers, where if the Boolean equation is satisfied for a comment and/or if the comment has a certain sentiment classification (e.g., a negative classification) a response may be generated/selected and posted. For example, a response generation service 108B may be utilized to dynamically generate comments or select pregenerated a response to users comments using the results of the comment analysis service 106B.

As discussed above, optionally one or more predefined responses may be selected upon detecting a user comment that meets a corresponding trigger. For example, if a comment is a positive comment, such as "I love [brand name]", and the system classifies the comment as a positive comment, the system may select a previously defined response for positive response, such as "Thank you!", "[brand name] loves you right back!"

A notification service 110B may be utilized to generate notifications based on the results of the comment analysis service 106B. For example, optionally, when a user comment satisfies a trigger and a response comment is generated and/or selected (where the response may include, text, audio, still images, video images, animations, icons, emoticons, and/or other content) an alert may be automatically generated and provided to one or more notification destinations (e.g., destination systems, email addresses, short messaging system addresses, phone numbers, etc.). The notification may include the generated/selected response to the comment which caused the trigger to be satisfied, a link to the platform where the comment was found, one or more comments earlier in time in the same comment thread, a date/time when the comment was posted, the trigger that was satisfied, and/or other data. The notification may include a screenshot of all or a portion of a webpage on which the comment was found.

A notification recipient may review the response and other data included in the notification. A publish control may be provided which when activated by the recipient causes the response comment to be published on the platform on which the triggering comment was identified as a response comment to the triggering comment. A block control may be provided which when activated causes the response comment to be inhibited from being posted. An edit control may be provided, which when activated, enables the recipient to edit the response comment (or enter a completely new response) and to save the edit the response comment. A select comment control may be provided which when activated enables the recipient to select a different response comment from a set of predefined comments as a new response. The edited/selected response comment may be published by activating the publish control.

A report generation service 112B may be utilized to generate reports using the results of the comment analysis service 106B. For example, a report may include quantifications of the number comments per sentiment type per platform and overall for a specified period of time. In addition, the report may include a trigger cloud to provide visual representation of content (e.g., single word, phrases including multiple words, images, tags) where the importance and/or quantity of a given content item may be indicated using font size, color, and/or other form of emphasis. The generated report may include a trend graph showing changes in relative sentiments over time.

One or more application programming interfaces 114B may be utilized to access data from third party systems (e.g., sentiment data, overall sentiment metrics (e.g., percent positive sentiments, percent negative sentiments, percent neutral sentiments), like/dislike user data, mentions of a brand, keywords identified on platforms, etc.).

Thus, the content customization system 114A may provide authentication and encryption services to provide for secure communication and restricted access of content, such as the unique, custom content of distributors.

Certain example user interfaces will now be described with reference to the figures.

Figure 8A:
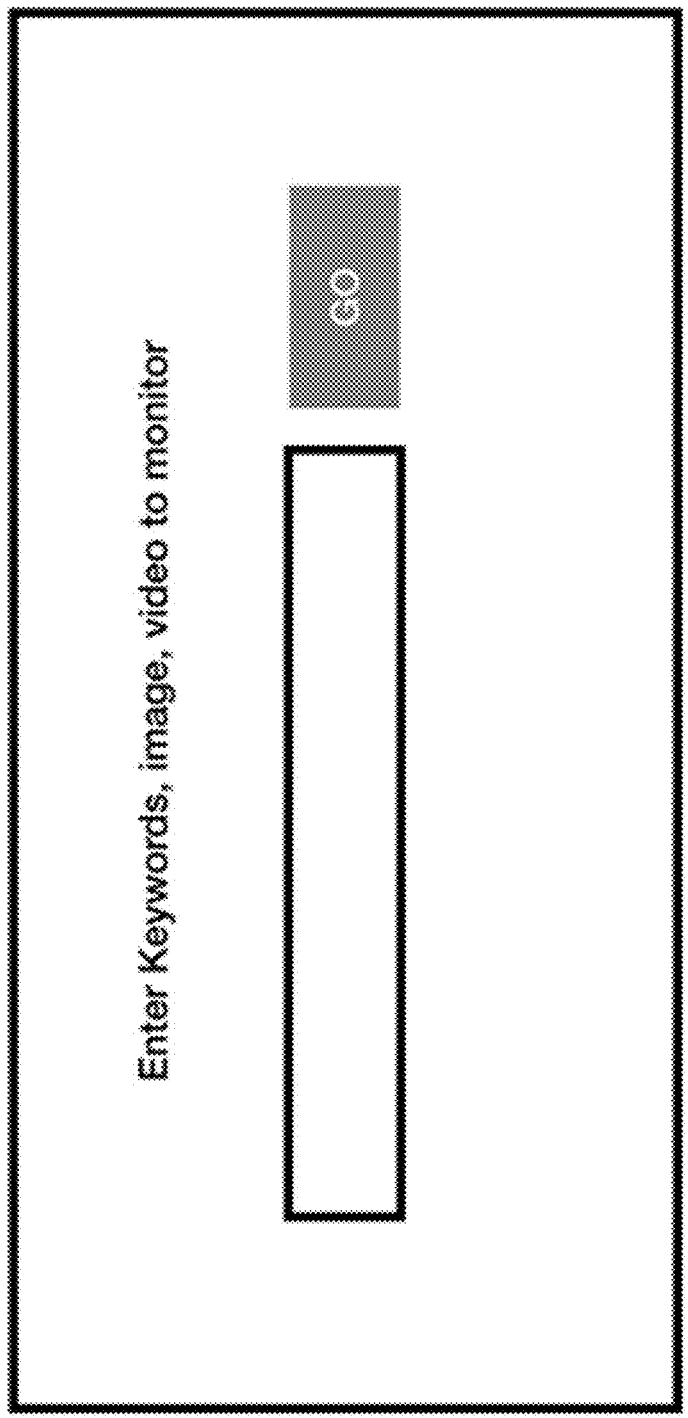

As illustrated in FIG. 8A, an example user interface (e.g., provided by a dedicated application hosted on a user device or served by a web service to a user device) may be provided via which an administrator user (e.g., a user associated with a brand, product, service, company, famous person, or other topic) may input analysis triggers (e.g., keywords, tags, names, phrases, images, videos) that are predicted to potentially be used by users of various platforms in their comments about the topic. The analysis may be associated with a project name (e.g., entered via a project name field or selected via a project name menu).

Optionally, a user interface may be provided via which a user may specify one or more platforms (e.g., social networking platforms, microblog platforms, content sharing platforms, etc.) to be monitored for user comments. For example, a user may select one or more platforms from a menu of platforms and/or may specify one or more platforms via corresponding fields.

Figure 8B:
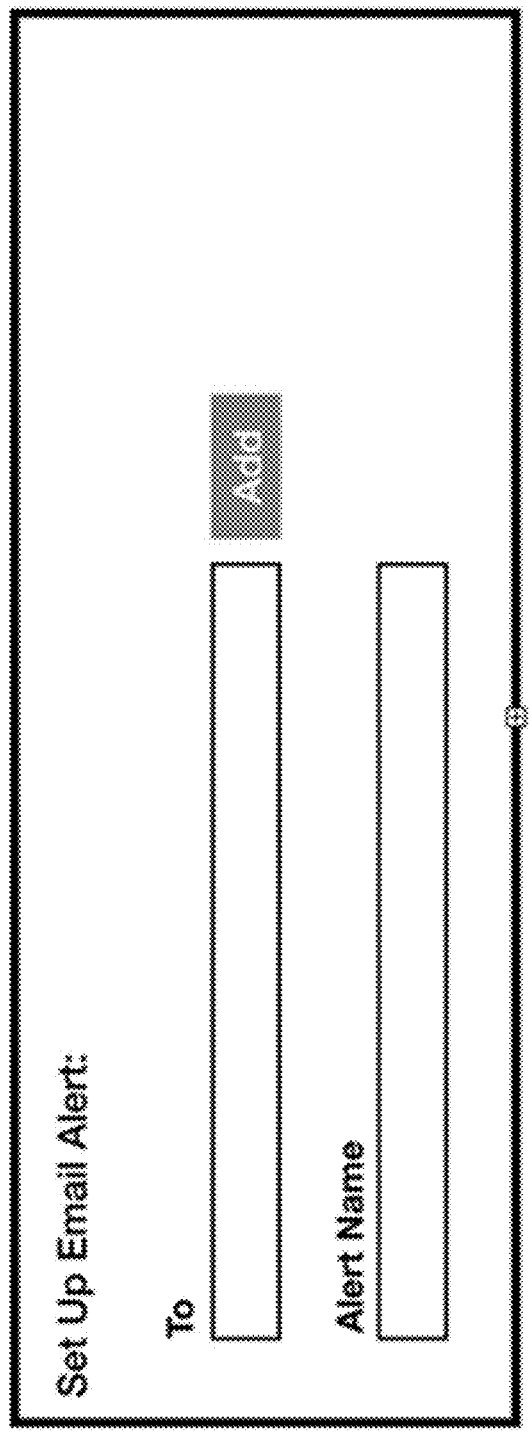

As illustrated in FIG. 8B, an example user interface may be provided via which a user can set up an alert to be generated when a trigger condition is satisfied with respect to a user comment. The user interface may include fields/menus via which a user can specify one or more notification destinations (e.g., destination systems, email addresses, short messaging system addresses, phone numbers, etc.) to which an alert notification is to be transmitted when a trigger is satisfied.

The alert notification may include the comment which caused the trigger to be satisfied, the trigger that was satisfied, an identification of the keywords and/or sentiment classification that satisfied the trigger, a link to the platform where the comment was found, one or more comments earlier in time in the same comment thread, a date/time when the comment was posted, and/or other data. The notification may include a screenshot of all or a portion of a webpage on which the comment was found. The user interface may include a name via which the user may enter a name for the alert.

In order to learn what users are actually saying about a given topic, the content monitoring and response system 104A may enable a search and analyze the pubic worldwide web or one or more platforms, using Boolean search definition logic, Natural Language Processing and/or artificial intelligence. For example, the system may collect relevant posts, comments, and conversations, and/or discover what words, phrases, images (e.g., still, video, or animated images, with text (e.g., memes) or without text), that are being utilized by users to express how people feel about the topic. Thus, for example, the system may monitor mentions of a topic on one or more online platforms to identify user perceptions regarding a topic and the number of mentions of the topic over a specified period of time and/or on a given platform. By way of illustration, a meme that is known to be very popular (e.g., as determined from a database of popular memes) may be monitored to detect usage of the meme (which may be a derogatory or complimentary meme) in conjunction with a given topic. Those findings of the foregoing search and analysis may be used to specify new triggers and/or to modify existing triggers.

The system may also import and integrate social listening, artificial intelligence tools and/or findings from third party sentiment aggregators to further define what to look for and flag.

Figure 8C:
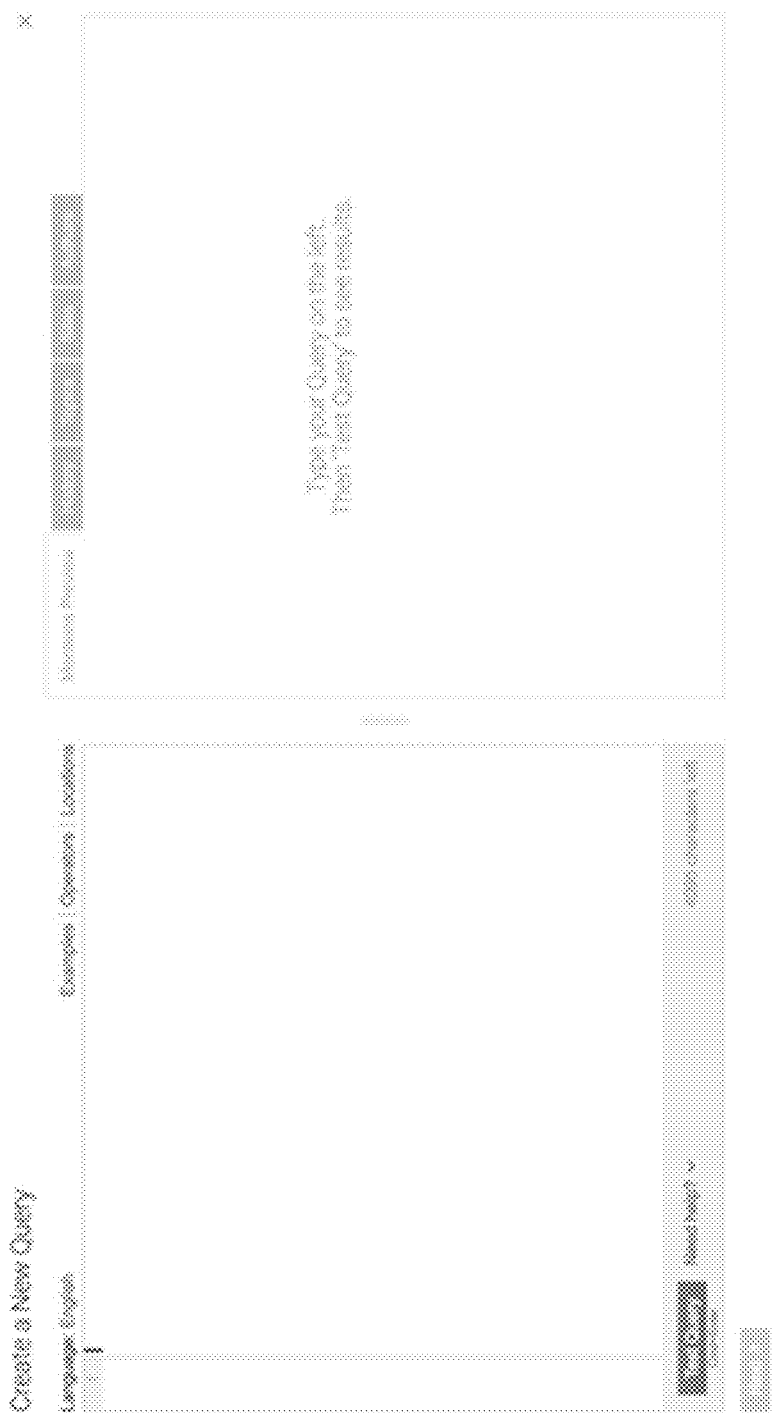

As illustrated in FIGS. 8C and 8D, example user interfaces may be provided via which the user may specify a query including one or more Boolean logic terms. For example, the user interface may enable the user to combine keywords or other content with operators (or modifiers) such as logical operators (e.g., AND, NOT, OR, AND Not, and/or exclusive OR) to further produce more relevant results. For example, a Boolean search could be ([brand name] AND "hideous"). This would limit the search results to identify those comments containing at least the brand name and the phrase "hideous".

As illustrated in FIG. 8D, a test control may be provided and activated by a user to cause a test of the trigger (sometimes referred to herein as a query). Activation of the test control may cause one or more platforms to be examined and a determination may be made as to comments (or phrases within comments) that satisfy the Boolean equation. The results may indicate graphically and/or numerically, the absolute and/or relative quantity of phrases that satisfy the Boolean equation. For example, a trigger cloud may be used to provide a visual representation of content (e.g., single word, phrases including multiple words, images, tags) where the importance and/or quantity of a given content item may be indicated using font size, color, and/or other form of emphasis. The trigger cloud may enable a viewer to quickly perceive the most emphasized content items, and use such information to modify the trigger (e.g., by adding or deleting terms from the Boolean equation) to identify more relevant user comments.

Figure 8E:

As illustrated in FIG. 8E, an example dashboard user interface comprising fields and controls enables a project to be defined, a name assigned to the project, locators (e.g., URLs) associated with platforms to be monitored entered, and the source of response comments specified. (e.g., a response module associated with the system providing the user interfaces or a third party response generator system). Links may be provided to other user interfaces, alerts, tools, and data discussed elsewhere herein.

Optionally, an administrator user interface may include a control via which an administrator user may specify that automatically generated and/or selected responses are to be automatically posted in response to a triggering comment on the corresponding platform without providing the comment for review to a human and/or without requiring approval from a human prior to posting.

Figure 2:
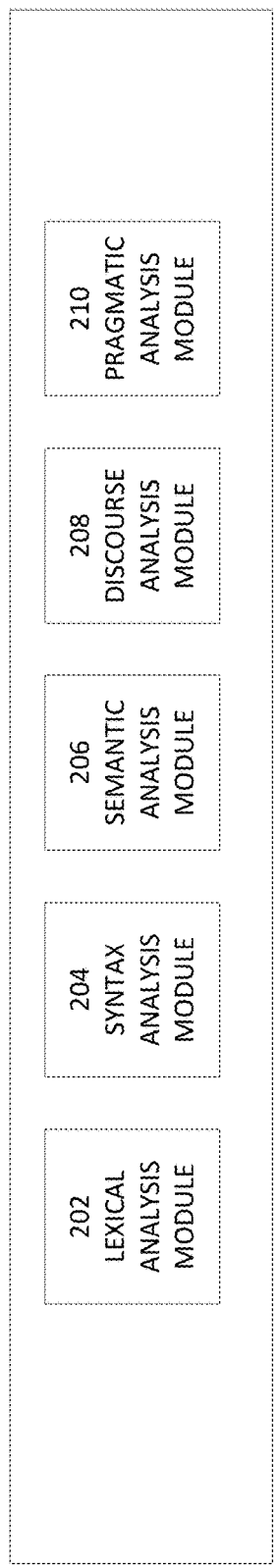
FIG. 2 illustrates an example natural language processing engine.

FIG. 2 illustrates an example implementation of a natural language processing engine which may be utilized by the comment analysis service 106B. A lexical analysis module 202 divides the text into paragraphs, sentences, and words. The lexical analysis module 202 may detect punctuation, such as commas, periods, exclamation points, colon, semicolons, carriage returns, brackets, and/or parenthesis in determining how to divide the text into paragraphs, sentences, and words.

A syntax analysis module 204 may parse the text to determine the meaning of the user comment. The syntax analysis module 204 may generate a structural representation of the text input after checking for correct syntax as per formal grammar rules. For example, a data structure may be generated in the form of a generally in the form of a (e.g., a parse tree or abstract syntax tree).

A semantic analysis module 206 analyzes the real meaning from the text, may discover the meaning of colloquial speech in online posts, may extract relevant and useful information from large bodies of unstructured data, and/or may uncover specific meanings of words used in foreign languages mixed with a local language (e.g., English). Latent Semantic Analysis (LSA) may be used to extract and represent the contextual-usage meaning of words by statistical computations applied to a large amounts of text. LSA may analyze and identify patterns in unstructured collection of text and the relationship between them.

Optionally, sentiment analysis may be performed on text to understand the opinion expressed by the text. For example, the sentiment may be quantified with a polarity (a positive or negative value). The overall sentiment may be inferred as positive, neutral or negative from the sign of the polarity score. Optionally, a given comment may be assigned a sentiment score (e.g., 1-5, where 1 and 2 are classified as a negative sentiment, 4 and 5 are classified as a positive sentiment, and 3 is classified as a neutral sentiment).

The semantic analysis module 206 may assign text elements respective logical and grammatical roles. The semantic analysis module 206 may analyze context in the surrounding text and the text structure to disambiguate the proper meaning of words that have more than one definition. The semantic analysis module 206 may analyze the logical structure of a given phrase, clause, sentence, or paragraph to identify the most relevant elements in the text and identify the topic discussed. The semantic analysis module 206 may also understand the relationships between different concepts in the text and use such understanding to understand the subject of the text.

A discourse analysis module 208 analyzes the text to determine the semantic conveyed by the text language and may identify the discourse relationships between clauses, sentences, and/or paragraphs to ensure coherence (e.g., where the meaning of a sentence may depend upon the meaning of the immediately preceding sentence). For example, a given sentence may provide elaboration or a contrast with a preceding sentience. The discourse analysis module 208 may also analyze text to identify a text act, such as a question, assertion, etc. The discourse analysis module 208 may split the text into discourse units, ensure the attachment between discourse units, and then label links between discourse units with discourse relations. The discourse analysis module may identify the topic structure, the coherence structure, the coreference structure, and the conversation structure for conversational discourse.

A pragmatic analysis module 210 analyzes the text and may reinterpret what was said to determine what was actually meant. For example, the pragmatic analysis module 210 may understand how units of speech (e.g., sentences) are used in different situations and how use affects the interpretation of the sentence. Thus, the pragmatic analysis module 210 may determine the likely intention of the speaker and the conversation to aid in the interpretation of the unit of speech.

Optionally, Bidirectional Encoder Representations from Transformers (BERT) may be used to transform comments to word embeddings. The embeddings, may be used to train a Convolutional Neural Network (CNN) using to identify certain sentiments (e.g., hate, approval, dislike, etc.). The CNN may be trained using a dataset of comments and different types of sentiments (love, like, hate, ridicule, obscenities, insults, etc.). The CNN may include an input layer, one or more hidden layers comprising neurons connected by weights, the weights corresponding to the strength of the connection between neurons, and an output layer. Each time a neural layer is trained on a sample comment, the difference between the predicted and true output causes an update in the weights a backpropagation process.

For example, the CNN may be used to tag a comment using one or more sentiment types. The tags assigned by the CNN may be compared to "correct" tags previously assigned to the same comments, and if the CNN incorrectly tag a comment, and error function may be used to generate weight updates.

Optionally, a recursive neural network or a recursive convolutional neural network may be used to perform sentiment classification.

Once a trigger word has been detected in a comment and the comment analyzed to determine the comment intent/sentiment, a determination may be made as to whether or not a comment should be generated in response.

Figure 3A:
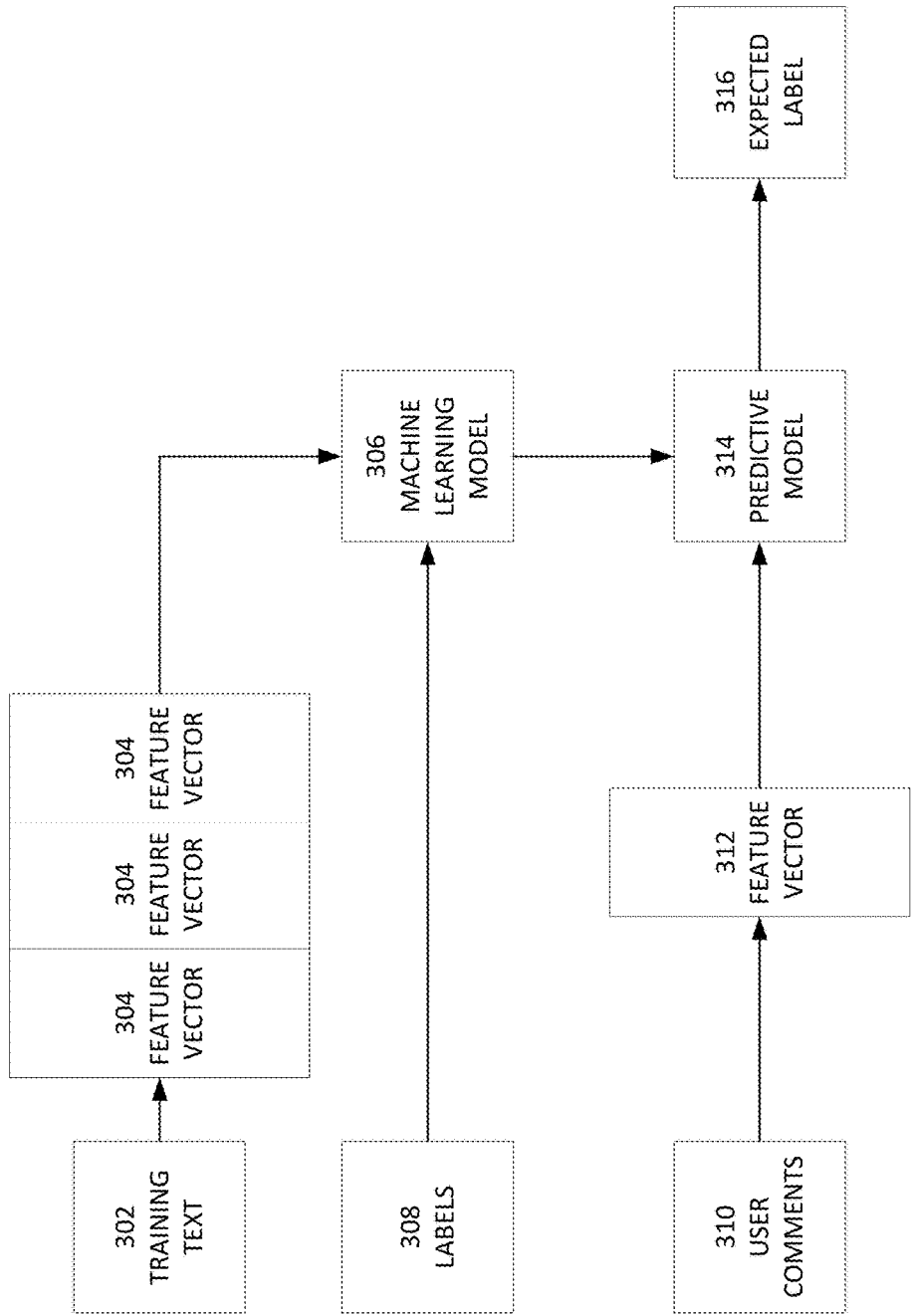
FIG. 3A illustrates an example supervised learning model environment.

FIG. 3A illustrates an example supervised learning model trainable to classify the sentiment of user comments. Training text 302 is provided to the supervised learning model to enable the supervised learning model to learn and predict categories/classes for the input text. One or more feature vectors 304 may be created using information describing characteristics of the input text.

The supervised learning model may use labels corresponding to predefined categories/classes that the model will predict (e.g., a sentiment score of 1-5, where 1 and 2 are classified as a negative sentiment, 4 and 5 are classified as a positive sentiment, and 3 is classified as a neutral sentiment). A machine learning model 306 utilizes an algorithm through which the model is able to handle text classification. A predictive model 314 is trained on the historical dataset to enable the predictive model 314 to perform label predictions.

Once trained, user comments 310A may be used as inputs, and one or more corresponding feature vectors 312 may be generated using information extracted from the user comments 310A. Optionally, to reduce the utilization of processing resources and memory utilization, certain text that may not be relevant to determining sentiment may be filtered out. For example, language stopwords (e.g., "etc.", "the", "is", "in", "for", "where", "when", "to", "at", or the like), URLs or links, and/or industry specific or highly technical words may be filtered out. Optionally, to further reduce the utilization of processing and memory resources, stemming (the stripping off of suffixes ("ing", "ly", "es", "s", etc.)) and/or lemmatization (obtaining the root form of the word) may be performed prior to or after identifying and removing stopwords. Optionally, the comments may be truncated to a first length and/or padded (e.g., with zeros) so as to be the first length so that all comments will have the same length for further processing. Optionally, comment words may be converted to a corresponding integer value. The predictive model 314 may then classify the sentiment of the user comments 310A using corresponding sentiment labels 316.

Figure 3B:
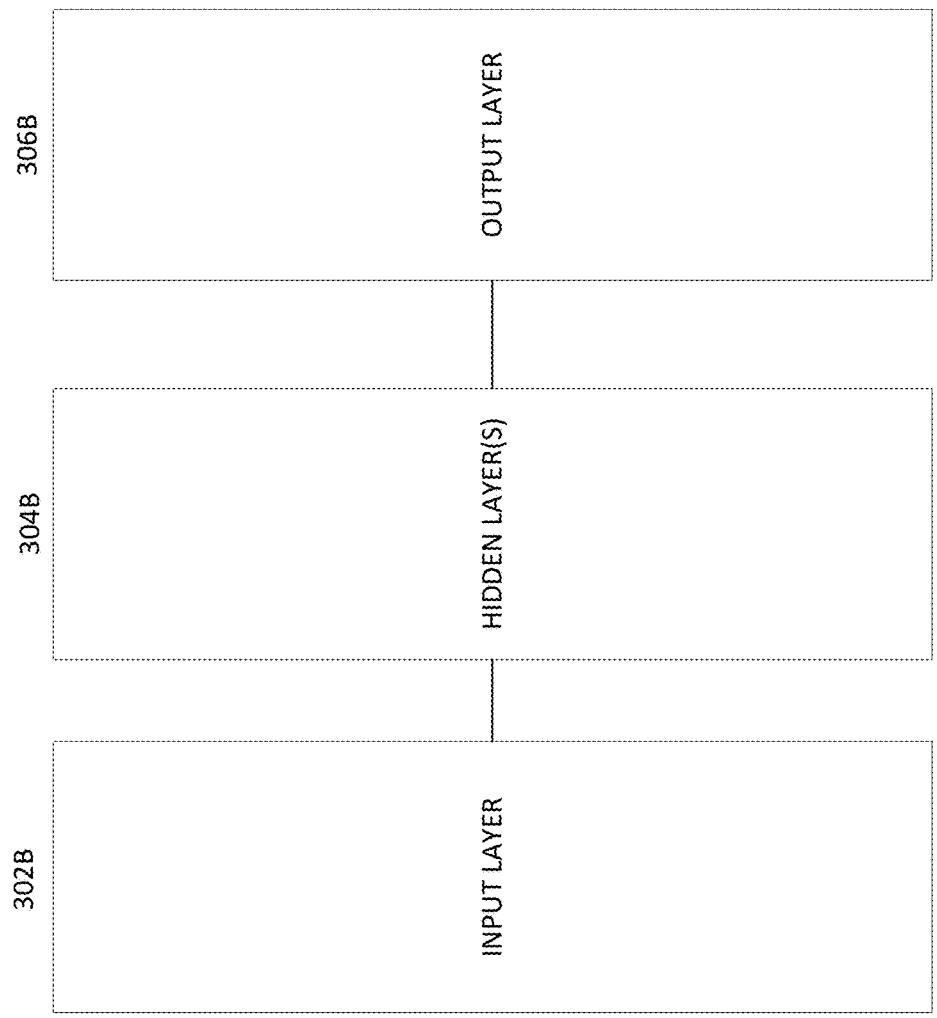
FIG. 3B illustrates an example neural network architecture.

FIG. 3B illustrates an example neural network which may be used to classify comments. The neural network may include an input layer 302B, one or more hidden layers 304B, and an output layer 306B. Optionally, the neural network may include (e.g., as the first hidden layer) a Keras Embedding Layer (which turns positive integers (indexes) into dense vectors of fixed size). The neural network may be configured as a feed forward network. The neural network may be configured with a shared-weights architecture and with translation invariance characteristics. One or more hidden layers may be configured as convolutional layers (comprising neurons/nodes connected by weights, the weights corresponding to the strength of the connection between neurons), pooling layers, fully connected layers and/or normalization layers. The neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Back propagation may be utilized, and the corresponding neural network weights may be adjusted to minimize or reduce the error. Optionally, the loss function may comprise the Binary Cross Entropy loss function.

Figure 4:
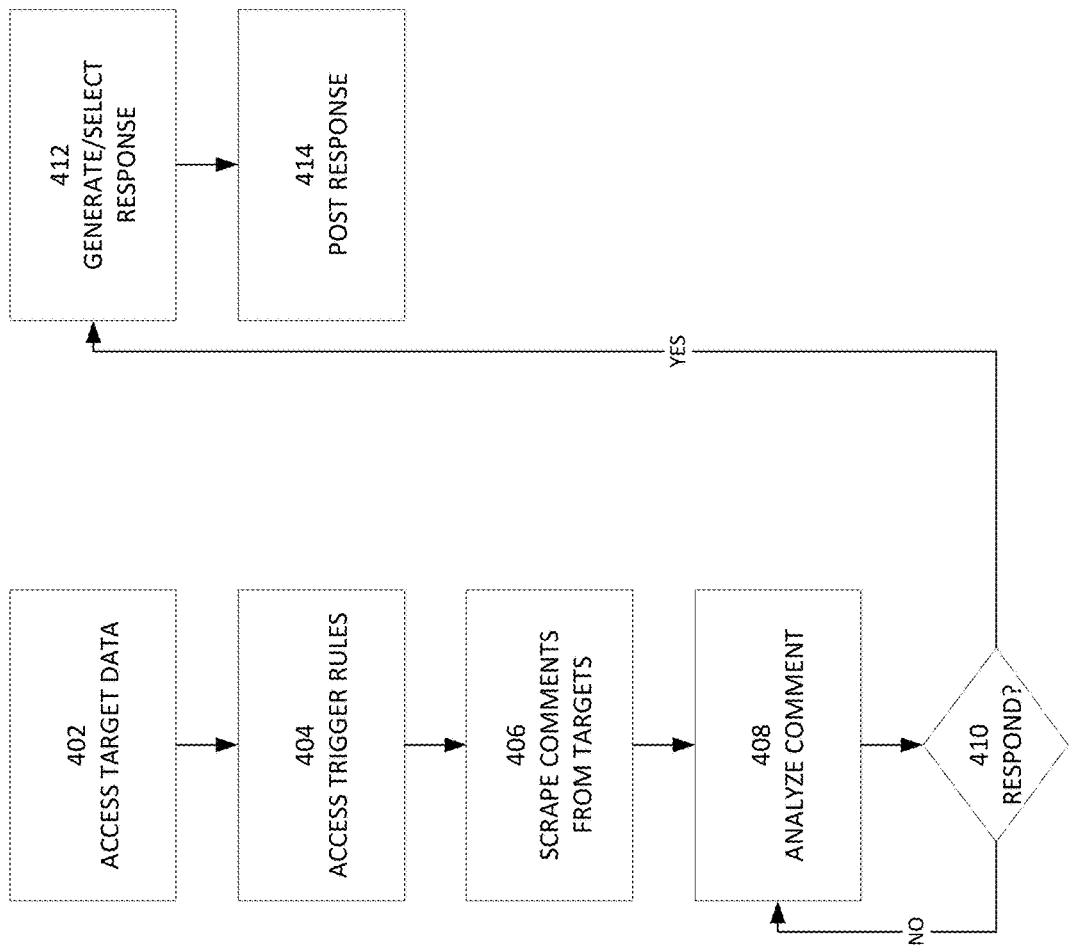
FIG. 4 illustrates an example process.

FIG. 4 illustrates an example process of analyzing content, determining if a response is to be selected or generated, and if so, posting a response. At block 402, target data used to identify platforms and online documents may be accessed (e.g., from a local or remote data store). For example, the target data may include social account locators (e.g., URLs), page titles and descriptions, email addresses, access tokens, and/or other identifiers or information. At block 404, trigger rules may be accessed (e.g., from a local or remote data store). For example, the trigger rules may include Boolean equations, sentiment classifications/scores and/or other rules that may be used to determine whether a response to a content (e.g., a comment) located on a target platform or document is to be provided. By way of example, the target data and/or the trigger rules may have been specified in whole or in part by a brand owner.

At block 406, using the accessed target data, a given platform/online document may be accessed, and user comments on the platform/online document may be identified and accessed. At block 408, a given comment may be analyzed (e.g., using one or more of the techniques described herein). For example, a comment may be analyzed to identify negative emoticons, negative video memes, key phrases (which may include one or more words), and/or comment sentiment (e.g., using a recursive convolutional neural network, a recursive neural network, and/or a convolutional neural network). Optionally, feedback by other users of the platform/document regarding the comment (e.g., the number of like and/or dislike indications regarding the comment, the number of user responses to the comments, the number of times the comment was shared, and/or the like) may be used in determining the comment sentiment.

At block 410, using a the accessed trigger rules, a determination may be made as to whether to respond to the comment. For example, if they comment included certain phrases and/or had a certain sentiment classification (e.g., a score of 1-2 or 4-5 on a scale of 1-5, where 1 and 2 correspond to negative sentiment, 4 and 5 correspond to a positive sentiment, and 3 corresponds to a neutral sentiment), a determination may be made that a response should be provided to the comment. If a determination is made that a response is not to be provided (e.g., because the comment did not include phrases that satisfied the trigger rule and/or did not have a sentiment classification that satisfied the trigger rule), the next comment may be analyzed.

If a determination is made that a response is to be provided, at block 412, a response may be selected or generated. For example, with reference to FIG. 5, a matrix may be defined for a given project that references responses to sentiment labels and key phrases. In this example, there is no responses in the matrix if there is a neutral sentiment label (e.g., a label of 3), but there are responses for both positive sentiments with certain key phrases (e.g., in response to comment that had the key phrase "Love it" with a sentiment label of 5, a response of "Thank you, we aim to please" may be selected) and negative sentiments with certain key phrases (e.g., in response to comment that had the key phrase "adulterated ingredients" with a sentiment label of 1, a response of "We are product that all our ingredients are certified organic" may be selected).

Optionally, instead, the comment may be transmitted to an administrator or other user to review and to manually enter a response for posting. Optionally, the comment may be transmitted to an administrator or other user with one or more selected responses (and optionally with the identified keywords visually emphasized and/or with the sentiment classification) so that the comment may be reviewed and the proposed response(s) may be selected, edited, and/or replaced by the user for posting At block 414 the response may be posted to the corresponding platform/online document.

{OLD—REWRITTEN}

Further, conventionally there are numerous online social networking and communities that provide users with an interface for interacting with other users. In some cases, online social networking is combined with offline elements such as face-to-face events. The ability of users to purchase products and obtain information from online services is revolutionizing the way business is done.

In addition, although existing social networks are powerful tools for interacting with people who have similar interests, such communities are not organized for users who have artistic talent (e.g., musical, acting, speaking, and/or other talents) to receive a part of resources, such as benefits/ proceeds (e.g., revenue) generated derived from byproducts (e.g., online distribution of the user's content) of their artistic talent and popularity.

Aspects of the disclosure relate to systems and methods for providing one or more services to an artist or a group of artists (who may be referred to as "content generator(s)") meeting a certain threshold of feedback and apportioning resources, such as benefits/proceeds (e.g., revenue), derived from services associated with content generator's performance, and distribution of third party content (e.g., advertisements) and content generator's media content. Information about a content generator and performance data associated with the content generator may be obtained. In certain embodiments, the performance data is a media file (e.g., audio, video, and/or text or any combination thereof). Once obtained, this performance data is then exposed to the community for feedback in a manner that is determinative of the outcome associated with a particular content generator. The community may include peers and other content generators that generally have an interest in the content generator's activities (e.g., a genre of music, videos, shows, podcasts, etc. Associated with the content generator's content) but may also comprise users who enjoy participating in an online community where new content generator content is plentiful.

After meeting a certain threshold of feedback from the online community, a decision is made to extend an offer to the content generator. Such an offer may include one or more services to promote the content generator, distribute the content generator's performance data, and allow for proceeds participation associated with such service.

Another aspect relates to the administration and monetization of methods of use of the submitted performance data and/or content generator's performance activity. In certain embodiments, the submitted performance data may be licensed for use by third parties for distribution through offline channels such as cell phones, podcasts, cable television, satellite television, and/or broadcast television. The submitted performance data may be licensed for reproduction on DVDs, videotapes and/or other formats for sale by the licensee. In embodiments, the content generator would be able to opt-in to any licensing program.

Various types of content generator activities benefit from the use of systems and methods disclosed herein. As such, content generator activities are not limited solely to the performing arts but should be viewed as any creative activity that gives rise to a user base when made available online. In addition to music, video and other performances works of authorship, such as blogs or other online commentary, may be considered a content generator activity.

The online community may optionally be utilized in determining what content generator activities should be further produced and enables the producing content generator(s) to share in the advertising and other possible proceeds streams once approval has been given. For example, the online community may control a performance's rise in popularity and may enable one or more sources of proceeds generated from the outcome associated with a particular content generator.

When a decision is made to select a content generator (e.g., based on the online community interaction with the content generator and/or content generator content), one or more services and associated proceeds participation may be extended to the content generator. Examples of such services may include, but are not limited to, advertisement placement, marketing, sponsorship, touring, licensing, extensions to content generator website/page, and/or distribution of content generator's performance data. Some aspects of the service may include either offline and/or online elements.

The content generator's submitted performance data may then be optionally offered for free or for sale. For example, sales occur in such cases where the system for obtaining media data or performance data is separate from a purchasing system. Submitted data can be synchronized across a network with the purchasing system so that it becomes accessible for sale. The content generator receives a portion of proceeds generated through one or more services and the portion may be a fixed percentage or a percentage based on a sliding scale that adjusts automatically to the proceeds generated from the services related to the content generator performance data. This sliding scale is unique to advertising proceeds participation and is an indirect measure of the content generator's popularity. This enables a content generator to receive proceeds in free download environments and provides additional proceeds to the content generator in pay-for-download venues.

Embodiments in which submitted performance data meeting a certain threshold of feedback and then provided through a service might be viewed as providing a rich example of the variety of possibilities for optimal proceeds participation and for the ability to relate such proceeds directly to the service. Users might pay a fee for the service, pay on a subscription basis, pay per show, pay per download, or pay on some other basis. Advertisers, sponsors, or programmers might pay for such service and allow users, for example, to view submitted performance data for free. In other embodiments users are given everything but music and video downloads for free. Optionally proceeds may be shared with users who generate business or traffic to the system by referring users and getting more and more referred business from content generators and users.

This party content providers (e.g., advertisers) find the ability to couple the third party content provider's content (e.g., an advertisement) with the content generator's performance data to be very valuable, and might be expected to pay for such services based on criteria such as number of ad viewings for which viewing is possible (e.g., in a manner analogous to Web ad impressions, pay-per-impression), the number of times an advertisement a link is activated (e.g., in a manner analogous to click-throughs, pay-per-click), the number of activations (such as if multiple activation opportunities per ad are provided, and also analogous to click-throughs), the number of leads obtained (pay-per-lead), the number of transactions completed (pay-per-transaction), or other such variations. Many of these and similar pricing schemes might be applicable to embodiments providing offline service as well, such as including advertisement in touring or live performance venue.

A proportionate share of proceeds for example can be provided to a content generator selected by the community for performances conducted offline. Hence television shows, plays, and any other type of performances that occur offline may still trigger a proportionate payment to the content generator if the performing content generator was initially chosen by the online community or viewers whose votes triggered the content generator to be signed with a representative such as a record label or other entity promoting the content generator's work.

Optionally, having been chosen by the community itself is not determinative of being able to obtain a proportionate share of proceeds. A content generator that becomes increasingly popular in the community as judged by page views, number of friends, fans or some other measure of popularity may obtain the same status as one originally elected by the community once a certain threshold is reached. A content generator or user, for example, that has 1 million page views may qualify for a proportionate share of proceeds on advertising, items sold and promoted on their personal profile page.

Submitted performance data can be optionally made available for distribution on a service as a ring tone data or a general media file that can be downloaded into a cell phone, media playable device, or other computation device where use of such files might be applicable. In the instance where the performance data is video, a user may download the video data for purchase via online distribution channels or be bought on various media through a third party distribution network.

By apportioning proceeds with a content generator, the content generator has an incentive to provide performance data and refer users and other content generators to the system. This helps the system build a network including an unlimited number of advertisers, getting more and more referred business from content generators and users. At the same time, the system can reduce its own advertising ventures and expenses. Furthermore, through the use of user account, the system can apportion proceeds with content generator and end users, and for each of its various online sites that sell intangible and tangible items.

Optionally, systems and methods may be provided that enable the monitoring of recorded or live performances (or other content) of certain users and viewer interaction with such content (e.g., distributed electronically such as via online social media platforms). Such systems and methods may be configured to select content generating users meeting a certain threshold of feedback and apportioning benefit derived from services, optionally based on network traffic (e.g., views, playbacks in whole or in part, sharing, and or the user of user generated data) associated with a content generating user's performance data, and distribution of advertisement and content generating user's media content.

As aspect of the disclosure relates to systems and methods that may be utilized to enable users to benefit from (e.g., monetize) their content. An aspect of the present disclosure relates to systems and methods that optionally enables independent and other content generating users to exploit their content and have a community of content consumers/end users democratically determine what content they want to see more of by providing feedback regarding such content.

As aspect of the disclosure relates to systems and methods configured to provide one or more services to content generating user meeting one or more feedback thresholds and apportion benefit derived from the services related to content generating user's performance activities and distribution of performance data.

The general methodology for obtaining and synchronizing performance data involves obtaining information about a content generating user and obtaining performance data associated with the content generating user. The term performance data refers to any content (e.g., video content (which may include an audio track), audio-only content, text content, etc.) captured within a tangible medium such as computer memory. Such performances data may be recorded in audio and/or video form prior to or simultaneous with submission to the community. Although certain examples herein may relate to musical performances, the systems and methods disclosed herein may be used for other types of performances (e.g., acting performances, comedy performance, dancing performances, readings, unboxings, interviews, video performances or works of art such as drawings, paintings or other visual renditions made by a content generating user).

Information related to the content generating user may be obtained in any manner including via telephonic communication, an application hosted on a user device (e.g., mobile smartphone, laptop, tablet, desktop computer, video streamer, set top box, smart television, etc.), and/or website based communication. Likewise, by way of example, media such as performance data may be obtained over a telecommunication medium such as a wireless or wire based telephone channel, over an Internet based streaming or telephone channel, as an upload to a cloud based storage system, or otherwise.

For example, online personal profile pages hosted by a content distribution system enables users to use a VoIP (Voice over Internet Protocol) communication link (e.g., Skype™) to talk with friends and other users (via voice only or via a video/voice call), and stream their content playlist and content across the network link (e.g., the Internet or other internetwork or intra-network) to the corresponding destination. When a content generating user's performance is captured in video form (e.g., 3GPP, AVI, FLV, MOV, MPEG4, MPEGPS, WebM, WMV or other video encoding format) that video and the accompanying audio data may be uploaded over the network to the content distribution system to enable a community viewers interact with the video and for determination as to the popularity of the video/performance data.

In addition, systems and methods described herein enable a user to create their own custom radio station on their personal profile page with their own playlist/content they may web cast from their personal page. The custom station may be provided and/or accessed using such channels as RSS, podcasting, email, text messaging, via a search engine, a podcast app, or otherwise. For example, a search user interface that enables a user to search for content by content name, metadata, performer name, and/or otherwise. A search engine may receive the search query locate matches and generate search results which may be displayed to the user. The user may select one or more of the search results and select a radio station. The user may add the selected search results to the selected radio station. Optionally, a user interface may be provided that enables the user to create a new radio station and name the radio station.

Certain services made be available to content generating users based on viewer feedback. Such services may include, by way of example, one or any combination of media production, marketing, content generating user management, sponsorship, media or performance data distribution, touring, and licensing. A service may be an online service and provision of the service may be automated by a server process. For example, such server-provided service may be applied to online distribution of submitted performance data. Other services may utilize an external intermediary (e.g., a business manager or agent) who provides the service initiated by a server process using a technological communication channel (e.g. email, user interface notification). Where online interfacing is applicable, presenting aspects of service to a user can be implemented using any graphical user interface or web interface configured to obtain data from a server and present the data. Optionally, any form of monetization arising from presenting third party content, such a advertisements (e.g., displayed in conjunction with performance data) during the service provided to content generating user may be shared with the content generating user.

Figure 6:
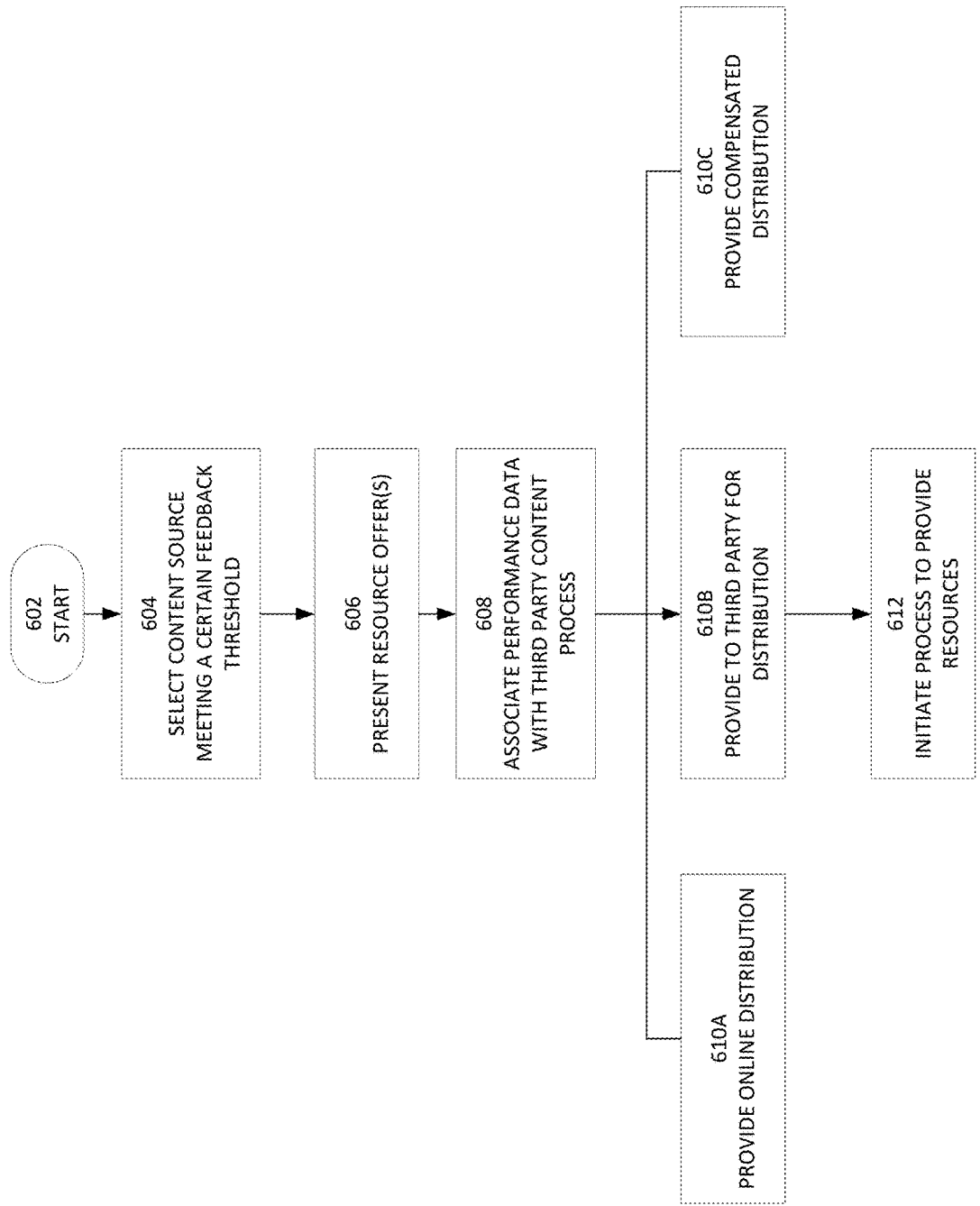
FIGS. 6 and 7 illustrate example processes.

FIG. 6 illustrates an example flow diagram of a process configured to provide one or more services to content generating users meeting one or more thresholds of feedback. Further, the process may be utilized to apportion benefits derived from the services related to content generating user's performance activities and distribution of submitted performance data. Processing may be performed using a server or cloud-based system coupled to a data repository and to a global communication network. At step 602, the process begins.

For a performance data exposed to the community for feedback (e.g., via a website, an app, podcast, or otherwise), viewer feedback may be monitored and analyzed. Such feedback may include one or more of views, number of likes, positive or negative textual or icon comments, number of friends, fans, and/or some other measure of popularity. At step 604, the content generating user is selected on reaching a predetermined threshold condition or value of feedback generated from community rankings and feedback mechanisms. Any manner of determining a threshold condition or value for selecting content generating user including relative or fixed number of feedback, or qualitative or quantitative feedback condition may be used.

For example, but not limited to, the selection of a content generating user may occur upon a feedback reaches a threshold condition or value (e.g., when the ranking of submitted performance on a genre within the music category reaches Top 10 or other level; or when the positive feedback on submitted performance data for a sub-category within the video category exceeds 32% (or other percentage) of the quantity of the registered users; or when the content generating user is voted as a winner of an audition, etc.). Selection of a content generating user may take place periodically (e.g., weekly, or quarterly).

Resource offers, such as a benefit participation and a service offer, are presented to the content generating user at 606. Such offers may be presented to a user using a graphical user interface or web interface configured to obtain data from a server and present the data to a plurality of users. For example, a Skype™ or other such communication interface may provide a free interface between users and content generating user. The presentation of offers allows a selected content generating user to opt into one or more offered services. An offer may be dynamically generated prior to presentation depending on availability of one or more service and whether the service has a different threshold value or condition.

For example, an additional service may be available for content generating users reaching a second, relatively higher threshold value or condition. Services may also be offered depending on a condition, which is recorded in a database, as set up by advertisers, sponsors, or programmers seeking a certain target audience. The selected content generating user is offered compensation from the benefit generated from third party content items displayed in association with content of the content generating user or affiliate page and/or sale of any media with the submitted performance data. Third party content items may be in any form and include but are by no means limited to online third party content items (e.g., video, image and other types of ads, etc.). Upon accepting an offer, the content generating user's user account is configured to be associated with a benefit participation process.

After presentation, submitted performance data is associated with an third party content item (e.g., advertisement) process at 608. The third party content item process controls and tracks the instances or scores for viewing of third party content items (e.g., advertisements) retrieved from a data repository and displayed with the media contents of the content generating user or affiliate page on the system. The third party content item process is coupled with the benefit participation process, which records the instances or scores of viewing third party content item on the user account of selected content generating user. By way of example, popularity may be determined by votes rather than a ranking, although both techniques may be utilized.

For advertisement on an offline service, advertisement media may be coupled with performance data or be displayed at a venue for a content generating user's performance, such as a banner at the concert during a content generating user concert tour or previewing advertisement video on media containing video of the submitted performance data. Keeping in the spirit of the disclosure, to enable the benefit participation, any process that allows tracking of instances of third party content items such as number of ad viewings for which viewing is possible, number for which third party content item link is activated, number of activations, number of leads obtained, number of transactions completed, or other such variations.

Distribution of submitted performance data occurs at one or any combination of: providing online distribution, providing to third party for distribution, and providing media sales at 610A, 610B, 610C respectively. Submitted performance data may be synchronized with a purchasing system so that it becomes accessible. In another embodiment, submitted performance data may be available for free on online distribution coupled with third party content item placement which in turn generates benefit using methods discussed herein. In these instances where the performance data is video, user may upload the video data for purchase via the Internet or be bought on various media through a third party distribution network. In these embodiments, the submitted performance data may be licensed for use by third parties for distribution through offline channels such as cell phones, podcasts, cable television, satellite television, and/ or broadcast television. The licensee may license the submitted performance data for reproduction on DVDs, videotapes and/or other formats for sale.

A process to provide one or more services and associated benefit participation is enabled at 612. A system may execute one or more processes to provide service and benefit participation as optioned by a selected content generating user at 606. The benefit participation process tracks one or more benefit-generating activities (e.g. advertisement, distribution of the content generating user's performance data, licensing, sponsorship, and touring) and apportions a percentage of benefit to the selected content generating user's user account.

In certain embodiments, the service process may route email or establish telephone communication between a service provider intermediary and a content generating user thus initiating the service, which is then provided to the content generating user by the service provider intermediary. For example, the process may notify a business manager by email via a global communication network to secure sponsorship for a selected content generating user. Such service provided by a service provider includes media production, marketing, content generating user management, sponsorship, trading or distribution, touring, and licensing.

Figure 7:
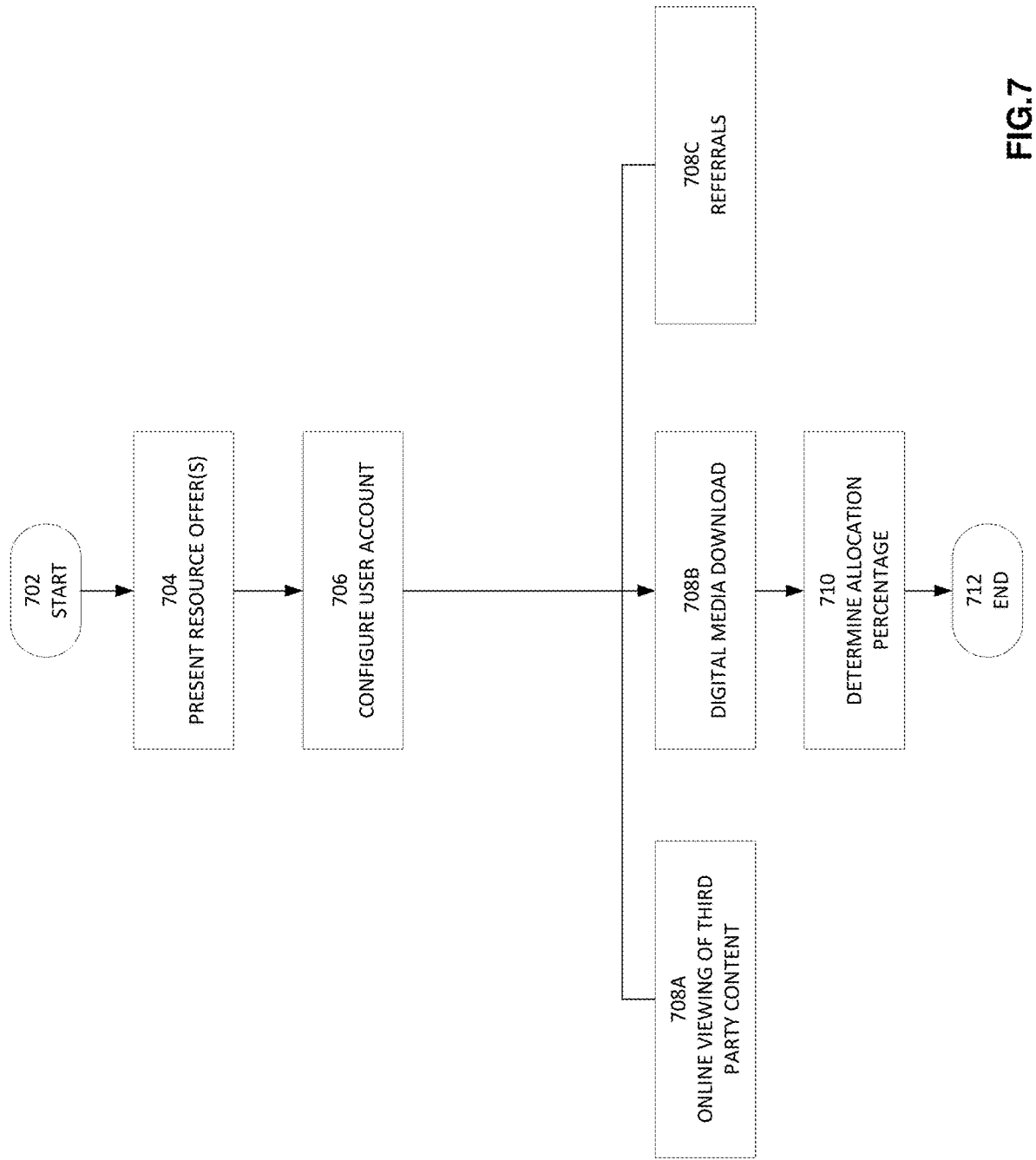

FIG. 7 is a flow diagram that illustrates an embodiment of benefit/resource distribution participation process. Processing starts at 702. Resource/benefit participation and a service offer are presented at 704. An offer can be presented to a user using any graphical user interface or web interface configured to obtain data from a server and present the data to a plurality of users. The presentation of offer 704 allows a selected content generating user to opt into one or more service. An offer may be dynamically generated during the presentation depending on availability of one or more service and whether the offer of a service has a different threshold value or condition (e.g. sponsor looking for a winner of a music audition of a specific genre).

Upon accepting an offer, the user account of the content generating user is configured at 706 to allow a database to record on the user account and track scores or instances of one or a combination of benefit-generating sub processes such as online viewing of third party content (e.g., advertisements) on the user's media content (e.g., webpage) 708A, digital media download of the content generating user's performance data 708B, and/or online referrals initiated by the selected content generating user 708C.

Determination of a percentage for apportioning benefit takes place periodically at 710. The percentage determination may be based on a sliding scale in which higher percentage of benefit is apportioned to the user account for a higher number of third party content viewings 708A, digital downloads 708B, and referrals 708C. The determination of a percentage may give a greater weight to one or more scores tracked from, for example, third party content viewing 708A and digital media download of the content generating user's performance data 708B. The process may end at 712.

An aspect of the disclosure relates to a non-transitory computer-readable medium comprising computer-readable instructions which when executed by one or more processors cause said one or more processors to perform a process comprising: obtaining a media file comprising a content item associated with a content source; storing said media file in a tangible, non-transitory computer-readable medium accessible by one or more computers over a network; associating said media file with an account associated with said content source; presenting said media file to a community including one or more viewers; obtaining feedback on said content item from at least one viewer; determining that a threshold or condition, based at least in part on said feedback, has been met; enabling said content source to participate in a first program based at least on said threshold or condition being met; enabling advertisement content to be presented on devices of one or more members of said community in conjunction with said media file after enabling said content source to participate in the first program; after enabling advertisement content to be presented on devices of one or more members of said community in conjunction with said media file, based in part on at least one activity comprising subsequent community interaction with said media file: providing an incentive to said content source.

An aspect of the disclosure relates to a method, comprising: with respect to a media submitter, determining whether a threshold or condition has been met; enabling said media submitter to participate in a first program based at least on said threshold or condition being met; obtaining a media file from the media submitter; storing said media file in a tangible, non-transitory computer-readable medium accessible by one or more computers over a network; associating said media file with an account associated with said media submitter; presenting said media file to a community including one or more viewers; obtaining feedback on said media file from at least one viewer; enabling advertisement content to be presented on devices of one or more members of said community in conjunction with said media file after enabling said media submitter to participate in the first program; after enabling advertisement content to be presented on devices of one or more members of said community in conjunction with said media file, based in part on at least one activity comprising subsequent community interaction with said media file: providing an incentive to said media submitter.

An aspect of the disclosure relates to a system, comprising: a media file data repository accessible by one or more computers over a network; a server configured to: with respect to a media submitter, determining whether a threshold or condition has been met; enabling said media submitter to participate in a first program based at least on said threshold or condition being met; obtain a media file from said media submitter; store said media file in the media file data repository; associate said media file with an account associated with said media submitter; present said media file to a community including one or more viewers; enable said media submitter to participate in a first program based at least on said threshold or condition being met; enable advertisement content to be presented on devices of one or more members of said community in conjunction with said media file after enabling said media submitter to participate in the first program; after enabling advertisement content to be presented on devices of one or more members of said community in conjunction with said media file, based in part on at least one activity comprising subsequent community interaction with said media file: provide an incentive to said media submitter.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

{END OF OLD MATERIAL}

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A non-transitory computer-readable medium comprising computer-readable instructions which when executed by one or more processors cause said one or more processors to perform a process comprising:
　　access a locator of an online networked resource;
　　access the online networked resource using the locator;
　　identify a first item of content of a first type on the accessed online networked resource, the first item of content in a first comment thread;
　　access a trigger rule, the trigger rule comprising one or more keywords and a sentiment classifier;
　　use a neural network comprising:
　　　　an input layer,
　　　　one or more hidden layers, and
　　　　an output layer,
　　to assign a sentiment classification to the first item of content;
　　identify whether the first item of content includes one or more of the keywords;
　　determine, using the trigger rule, the assigned sentiment classification generated using the neural network and keywords identified in the first item of content, whether response content is to be posted to the online networked resource;

at least partly in response to determining, using the trigger rule, the assigned sentiment classification generated using the neural network and keywords identified in the first item of content, that response content is to be posted to the online networked resource, determine whether to use a predefined second item of content or to dynamically generate a second item of content, the assigned sentiment classification generated using the neural network and keywords identified in the first item of content;

generate a notification comprising a link to the first item of content on the online networked resource, one or more comments in the first comment thread earlier in time than the first item of content, and timing information corresponding to when the first item of content was posted in the first comment thread;

transmit the notification to a first destination;

enable the predefined second item of content or the dynamically generated second item of content to be posted to the online networked resource in accordance with the determination as to whether to use a predefined second item of content or to dynamically generate a second item of content.

2. The computer-readable medium of claim 1, wherein said neural network comprising a recursive convolutional neural network, and where said one or more hidden layers comprises a Keras Embedding Layer, the process further comprising truncating or padding the first item of content prior to using the neural network to classify the sentiment of the first item of content.

3. The computer-readable medium of claim 1, wherein said first item of content comprises a comment regarding a first subject, and wherein the second item of content comprises a response to the comment regarding the first subject.

4. The computer-readable medium of claim 1, wherein determining, using the trigger rule, the assigned sentiment classification generated using the neural network and keywords identified in the first item of content, whether response content is to be posted to the online networked resource, further comprises a determination as to whether the assigned sentiment classification is a negative sentiment classification.

5. The computer-readable medium of claim 1, the process further comprising performance of a lexical analysis, a syntax analysis, and a semantic analysis with respect to the first item of content.

6. The computer-readable medium of claim 1, wherein the first trigger rule comprises an Boolean equation including two or more keywords and one or more Boolean operators.

7. The computer-readable medium of claim 1, wherein said first item of content comprises text and video content.

8. The computer-readable medium of claim 1, wherein said first item of content comprises audio content.

9. A computer-implemented method, the method comprising:

accessing, using a computer system including one or more computing devices, a locator of an online networked resource;

accessing, using the computer system, the online networked resource using the locator;

identifying, using the computer system, a first item of content on the accessed online networked resource, the first item of content in a first comment thread;

accessing, using the computer system, a trigger rule, the trigger rule comprising one or more keywords and a sentiment classifier;

using a learning engine to assign a sentiment classification to the first item of content;

identifying whether the first item of content includes one or more of the keywords;

determining, using the trigger rule, the assigned sentiment classification generated using the learning engine and keywords identified in the first item of content, whether response content is to be posted to the online networked resource;

at least partly in response to determining, using the trigger rule, the assigned sentiment classification generated using the learning engine and keywords identified in the first item of content, that response content is to be posted to the online networked resource, using the assigned sentiment classification generated using the learning engine and keywords identified in the first item of content, determining whether to use a predefined second item of content or to dynamically generate a second item of content;

generating a notification comprising a link to the first item of content on the online networked resource, one or more comments in the first comment thread earlier in time than the first item of content, and timing information corresponding to when the first item of content was posted in the first comment thread;

transmitting the notification to a first destination; and enabling the predefined second item of content or the dynamically generated second item of content to be posted to the online networked resource in accordance with the determination as to whether to use a predefined second item of content or to dynamically generate a second item of content.

10. The computer-implemented method of claim 9, wherein said learning engine comprises a neural network, the method further comprising truncating or padding the first item of content prior to using the neural network to classify the sentiment of the first item of content.

11. The computer-implemented method of claim 9, wherein said first item of content comprises a comment regarding a first subject, and wherein the second item of content comprises a response to the comment regarding the first subject.

12. The computer-implemented method of claim 9, wherein determining, using the trigger rule, the assigned sentiment classification generated using the neural network and keywords identified in the first item of content, whether response content is to be posted to the online networked resource, further comprises determining whether the assigned sentiment classification is a negative sentiment classification.

13. The computer-implemented method of claim 9, the method further comprising using a natural language processing module to perform a lexical analysis, a syntax analysis, and a semantic analysis with respect to the first item of content.

14. The computer-implemented method of claim 9, wherein the first trigger rule comprises an Boolean equation including two or more keywords and one or more Boolean operators.

15. The computer-implemented method of claim 9, wherein said first item of content comprises text and video content.

16. The computer-implemented method of claim 9, wherein said first item of content comprises audio content.

17. A computer system comprising:
a computing device;
a network interface;
a non-transitory data media configured to store instructions that when executed by the computing device, cause the computing device to perform operations comprising:
 access a locator of an online networked resource;
 access the online networked resource using the locator;
 identify a first item of content on the accessed online networked resource, the first item of content in a first comment thread;
 access a trigger rule, the trigger rule comprising one or more keywords and a sentiment classifier;
 use a learning engine to assign a sentiment classification to the first item of content;
 identify whether the first item of content includes one or more of the keywords;
 determine, using the trigger rule, the assigned sentiment classification generated using the learning engine and keywords identified in the first item of content, whether response content is to be posted to the online networked resource;
 at least partly in response to determining, using the trigger rule, the assigned sentiment classification generated using the learning engine and keywords identified in the first item of content, that response content is to be posted to the online networked resource, use the assigned sentiment classification generated using the learning engine and keywords identified in the first item of content to determine whether to use a predefined second item of content or to dynamically generate a second item of content;
 generate a notification comprising a link to the first item of content on the online networked resource, one or more comments in the first comment thread earlier in time than the first item of content, and timing information corresponding to when the first item of content was posted in the first comment thread;
 transmit the notification to a first destination; and
 enable the predefined second item of content or the dynamically generated second item of content to be posted to the online networked resource in accordance with the determination as to whether to use a predefined second item of content or to dynamically generate a second item of content.

18. The computer system of claim 17, wherein said learning engine comprises a neural network, the operations further comprising truncate or pad the first item of content prior to using the neural network to classify the sentiment of the first item of content.

19. The computer system of claim 17, wherein said first item of content comprises a comment regarding a first subject, and wherein the second item of content comprises a response to the comment regarding the first subject.

20. The computer system of claim 17, wherein determining, using the trigger rule, the assigned sentiment classification generated using the neural network and keywords identified in the first item of content, whether response content is to be posted to the online networked resource, further comprises a determination as to whether the assigned sentiment classification is a negative sentiment classification.

21. The computer system of claim 17, the operations further comprising: use a natural language processing module to perform a lexical analysis, a syntax analysis, and a semantic analysis with respect to the first item of content.

22. The computer system of claim 17, wherein the first trigger rule comprises an Boolean equation including two or more keywords and one or more Boolean operators.

23. The computer system of claim 17, wherein said first item of content comprises text and video content.

24. The computer system of claim 17, wherein said first item of content comprises audio content.

* * * * *